US010999601B2

(12) United States Patent
Chen et al.

(10) Patent No.: US 10,999,601 B2
(45) Date of Patent: May 4, 2021

(54) LINE-BASED COMPRESSION FOR DIGITAL IMAGE DATA

(71) Applicant: Texas Instruments Incorporated, Dallas, TX (US)

(72) Inventors: Ying Chen, West Lafayette, IN (US); Madhukar Budagavi, Plano, TX (US); Minhua Zhou, San Diego, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/434,832

(22) Filed: Jun. 7, 2019

(65) Prior Publication Data

US 2019/0289325 A1 Sep. 19, 2019

Related U.S. Application Data

(60) Continuation of application No. 15/357,759, filed on Nov. 21, 2016, now Pat. No. 10,368,093, which is a division of application No. 14/199,558, filed on Mar. 6, 2014, now Pat. No. 9,503,722, which is a division
(Continued)

(51) Int. Cl.
| | |
|---|---|
| *H04N 7/12* | (2006.01) |
| *H04N 19/593* | (2014.01) |
| *H04N 19/13* | (2014.01) |
| *H04N 19/61* | (2014.01) |
| *H04N 19/11* | (2014.01) |
| *H04N 19/146* | (2014.01) |
| *H04N 19/182* | (2014.01) |
| *H04N 19/174* | (2014.01) |
| *H04N 19/423* | (2014.01) |
| *H04N 19/124* | (2014.01) |
| *H04N 19/15* | (2014.01) |
| *H04N 19/159* | (2014.01) |

(Continued)

(52) U.S. Cl.
CPC .......... *H04N 19/593* (2014.11); *H04N 19/11* (2014.11); *H04N 19/124* (2014.11); *H04N 19/13* (2014.11); *H04N 19/146* (2014.11); *H04N 19/15* (2014.11); *H04N 19/159* (2014.11); *H04N 19/174* (2014.11); *H04N 19/182* (2014.11); *H04N 19/423* (2014.11); *H04N 19/43* (2014.11); *H04N 19/61* (2014.11); *H04N 19/86* (2014.11)

(58) Field of Classification Search
CPC ...... H04N 19/11; H04N 19/124; H04N 19/13; H04N 19/146; H04N 19/15; H04N 19/159; H04N 19/174; H04N 19/182; H04N 19/423; H04N 19/43; H04N 19/593; H04N 19/61; H04N 19/86
USPC ....................................................... 375/240.12
See application file for complete search history.

(56) References Cited

U.S. PATENT DOCUMENTS

| | | |
|---|---|---|
| 5,680,129 A | 10/1997 | Weinberger et al. |
| 6,297,851 B1 | 10/2001 | Taubman et al. |
| 6,532,306 B1 | 3/2003 | Boon et al. |

(Continued)

*Primary Examiner* — Gims S Philippe
(74) *Attorney, Agent, or Firm* — Charles F. Koch; Charles A. Brill; Frank D. Cimino

(57) ABSTRACT

A method of compressing digital image data is provided that includes selecting an entropy code for encoding a line of pixels in the digital image data, wherein the entropy code is selected from a plurality of variable length entropy codes, using spatial prediction to compute a pixel predictor and a pixel residual for a pixel in the line of pixels, and selectively encoding the pixel residual using one of the entropy code or run mode encoding.

19 Claims, 14 Drawing Sheets

Related U.S. Application Data of application No. 12/572,408, filed on Oct. 2, 2009, now Pat. No. 8,705,623.

(51) Int. Cl.
*H04N 19/43* (2014.01)
*H04N 19/86* (2014.01)

(56) References Cited

U.S. PATENT DOCUMENTS

| | | |
|---|---|---|
| 7,664,148 B2 | 2/2010 | Sakai et al. |
| 7,738,714 B2 | 6/2010 | Lee et al. |
| 7,974,343 B2 | 7/2011 | Gao et al. |
| 8,194,989 B2 | 6/2012 | Lee et al. |
| 8,208,545 B2 | 6/2012 | Seo et al. |
| 8,705,623 B2 | 4/2014 | Chen et al. |
| 2001/0019429 A1* | 9/2001 | Oteki .................. H04N 1/2034 358/444 |
| 2003/0152150 A1* | 8/2003 | Fujimoto ............... H04N 19/51 375/240.24 |
| 2006/0013299 A1* | 1/2006 | Sato ..................... H04N 19/109 375/240.03 |
| 2007/0009047 A1 | 1/2007 | Shim et al. |
| 2007/0086523 A1* | 4/2007 | Yan ...................... H04N 19/136 375/240.13 |
| 2007/0116370 A1 | 5/2007 | Smirnov |
| 2007/0286497 A1* | 12/2007 | Podilchuk ............ G06K 9/6206 382/218 |
| 2008/0126278 A1* | 5/2008 | Bronstein ............. H04N 19/176 706/17 |
| 2008/0159397 A1* | 7/2008 | Kawashima ........... H04N 19/61 375/240.16 |
| 2009/0052528 A1* | 2/2009 | Jeon .................... H04N 19/197 375/240.12 |
| 2009/0254783 A1* | 10/2009 | Hirschfeld .......... G10L 19/0017 714/701 |
| 2010/0232722 A1 | 9/2010 | Park et al. |
| 2013/0011059 A1* | 1/2013 | Strom .................. H04N 19/14 382/166 |
| 2017/0116370 A1 | 4/2017 | Doerr et al. |

\* cited by examiner

LINE-BASED COMPRESSION FOR DIGITAL IMAGE DATA

CROSS-REFERENCE TO RELATED APPLICATIONS

This application is a continuation U.S. patent application Ser. No. 15/357,759, filed Nov. 21, 2016, which is a of divisional of U.S. patent application Ser. No. 14/199,558, filed Mar. 6, 2014, now U.S. Pat. No. 9,503,722, issued Nov. 22, 2016, which is a divisional of U.S. patent application Ser. No. 12/572,408, filed Oct. 2, 2009, now U.S. Pat. No. 8,705,623, issued Apr. 22, 2014, all of which are incorporated herein by reference in their entirety.

BACKGROUND OF THE INVENTION

The demand for digital video products continues to increase. Some examples of applications for digital video include video communication, security and surveillance, industrial automation, and entertainment (e.g., DV, HDTV, satellite TV, set-top boxes, Internet video streaming, digital cameras, cellular telephones, video jukeboxes, high-end displays and personal video recorders). Further, video applications are becoming increasingly mobile as a result of higher computation power in handsets, advances in battery technology, and high-speed wireless connectivity.

Video compression is an essential enabler for digital video products. Compression-decompression (CODEC) algorithms enable storage and transmission of digital video. Typically codecs are industry standards such as MPEG-2, MPEG-4, H.264/AVC, etc. At the core of all of these standards is the hybrid video coding technique of block motion compensation (prediction) plus transform coding of prediction error. Block motion compensation is used to remove temporal redundancy between successive pictures (frames or fields) by prediction from prior pictures, whereas transform coding is used to remove spatial redundancy within each block.

In many digital video products (e.g., a digital still camera, a digital video camera, a cellular telephone), video raw data is captured by a sensor and fed into a preview engine for processing. After processing, the resulting video sequence is stored in an external (i.e., off-chip) memory. A video encoder then fetches the video sequence from the external memory to encode it. In addition, during encoding, the video encoder both encodes a picture and stores a decoded copy of the picture in the external memory for use in prediction of a subsequent picture. The video encoder then fetches the decoded copy from the external memory when needed to perform prediction. Thus, the video encoder is fetching both pictures to be encoded and prior pictures from external memory to perform the encoding, and storing prior pictures in the external memory.

The real-time video data transfer from the preview engine to external memory and to and from external memory to the video encoder requires a lot of memory bandwidth if the video resolution is D1 (720×480) or higher. However, memory bandwidth is limited in many digital video products due to both cost and power constraints. Accordingly, reducing memory bandwidth requirements for processing video data is desirable.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
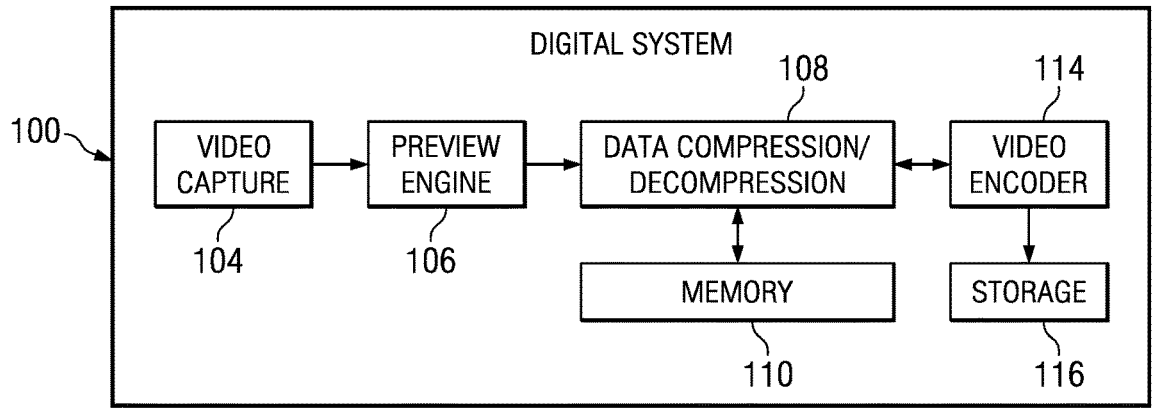
FIG. 1 shows a block diagram of a digital system in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein. Further, while various embodiments of the invention are described herein in accordance with the H.264 video coding standard, embodiments for other video coding standards will be understood by one of ordinary skill in the art. Accordingly, embodiments of the invention should not be considered limited to the H.264 video coding standard.

As used herein, the term digital image data refers to pixels in a single digital image or in a digital video sequence. The pixels may be all or a subset of a single digital image or may be all or a subset of a frame/picture in a digital video sequence, and may be have one or multiple color components. Further, a line of pixels is a horizontal row of pixels in a block of digital image data. Accordingly, although various embodiments of the invention are described herein in reference to processing of digital video sequences, embodiments for encoding of digital still images will be understood by one of ordinary skill in the art.

In general, embodiments of the invention provide for compression and decompression of digital image data to reduce memory bandwidth requirements for image/video encoding. More specifically, in one or more embodiments of the invention, to compress a pixel, spatial prediction is performed using selected neighboring pixels to compute a pixel predictor and a pixel residual. Then, the pixel is encoded using either variable length entropy encoding or some other form of encoding. In various embodiments, the encoding choice is made based on differing coding selection criteria. In some embodiments of the invention, only a single variable length code, an exponential Golomb code of order 0, is used for the entropy encoding and the other form of encoding is N-bit fixed length coding where N is the number of bits in a pixel.

In some embodiments of the invention, two or more variable length codes are available for entropy coding and a code to be used for the variable length entropy coding is selected from these codes for each line of pixels. In such embodiments, the available variable length codes include some combination of empirically selected Golomb and exponential Golomb codes. Further, the other form of encoding is run mode encoding in which a consecutive sequence of pixels in a line having zero value residuals is encoded in a single code word. In addition, the coding selection criteria used to decide if run mode encoding is to be used is such that no explicit signal needs to be added to the compressed digital image data to signal the decoder to decode the code word using run mode decoding. Instead, the decoder uses the same coding selection criteria to decide if run mode decoding is to be performed.

In one or more embodiments of the invention, to decompress a pixel, the compression process is essentially reversed. More specifically, spatial prediction is performed using the same selected neighboring pixels that were used for encoding the pixel to compute a pixel predictor. Then, the pixel is decoded using either variable length entropy decoding or another form of decoding corresponding to the other form of encoding used during compression. The decoding choice is made based on the same selection criteria used to select the encoding during compression. Further, if variable length entropy decoding is selected, the same variable length code used for encoding is used for decoding.

In some embodiments of the invention, raw digital image data is pre-processed and compressed using a compression method described herein and stored in an external memory. The compressed data is then decompressed when fetched from memory by an encoder to be encoded. Further, in some embodiments of the invention, reference data generated by an encoder during encoding of digital image data is compressed prior to storage in an external memory using a compression method described herein. The compressed reference data is then decompressed using a corresponding decompression method described herein when fetched from the external memory by the encoder for use in encoding.

FIG. 1 shows a block diagram of a digital system in accordance with one or more embodiments of the invention. The digital system is configured to perform compression and decompression of digital image data using embodiments of the methods for compression and decompression described herein. The digital system (100) includes a video capture component (104), a preview engine (106), a data compression/decompression component (108), a memory component (110), a video encoder component (114), and a storage component (116). The video capture component (104) is configured to provide digital image data to the preview engine (106). The video capture component (104) may include, for example, an image sensor such as a charge-coupled device (CCD) or a complementary metal-oxide-semiconductor (CMOS) sensor that captures analog image information in the form of pixels. The video capture component may include a color separator to separate pixel-sequential image signals into color-separated pixel signals, such as primary red (R), green (G) and blue (B) signals. The analog color-separated pixel signals are converted to digital image signals and provided to the preview engine (106).

The preview engine (106) includes functionality to perform image pre-processing tasks on the digital input signals. The image pre-processing tasks enhance the quality of the input image and convert it into a format for further processing, e.g., Y/Cb/Cr 4:2:2 format. These tasks may include color filter array (CFA) interpolation, color space conversion, gamma correction, another image enhancement tasks such as noise filtering and RGB blending. After the pre-processing, the digital image data is compressed by the data compression/decompression component (108) and stored in the memory component (110). The compression is performed in accordance with an embodiment of a method for compression described herein. The memory component (110) may be any suitable memory technology such as, for example, synchronous dynamic random access memory (SDRAM).

The video encoder component (114) includes functionality to encode captured, pre-processed digital image data. More specifically, the video encoder component (114) retrieves the digital image data from the memory (110) via the data compression/decompression component (108) and encodes it for storage in the storage component (116). The data compression/decompression component (108) decompresses the digital image data in accordance with an embodiment of a method for decompression as described herein. The storage component (116) may be any suitable storage technology, such as, for example, a secure digital card, an internal hard drive, etc.

In general, the video encoder component (114) retrieves the digital image data from the memory (110) as a sequence of video frames, divides the frames into coding units which may be a whole frame or a slice of a frame, divides the coding units into blocks of pixels, and encodes the digital image data in the coding units based on these blocks. During the encoding process, the video encoder component (114) uses reference data from previously encoded frames to encode subsequent frames. As is explained in more detail in reference to FIG. 2, the reference data is generated after encoding a frame and is stored, via the data compression/decompression component (108), in the memory (110). The data compression/decompression component (108) compresses the reference data before it is stored in the memory (110) in accordance with an embodiment of a method for compression as described herein. When the reference data is needed, the video encoder component (114) retrieves it from the memory (110) via the data compression/decompression component (108). The data compression/decompression component (108) decompresses the reference data prior to providing it to the video encoder component (114) in accordance with an embodiment of a method for decompression as described herein. The functionality of embodiments of the video encoder component (114) is described in more detail below in reference to FIG. 2.

The video encoder component (114) may perform encoding in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), etc. The video encoder component (114), the preview engine (106), and the data compression/decompression component (108) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 2:
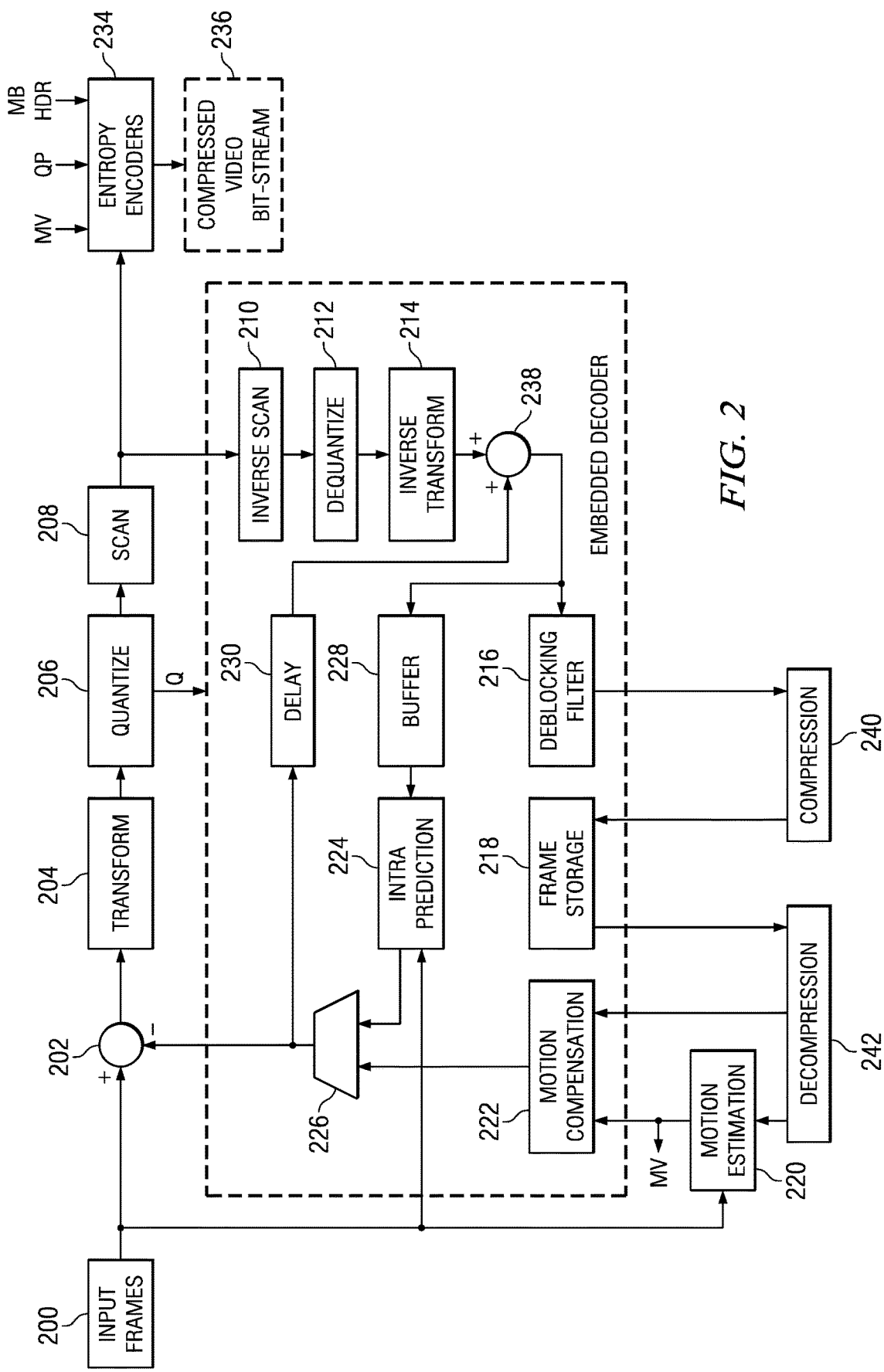
FIG. 2 shows a block diagram of a video encoder in accordance with one or more embodiments of the invention.

FIG. 2 shows a block diagram of a video encoder, e.g., the video encoder (114) of FIG. 1, in accordance with one or more embodiments of the invention. More specifically, FIG. 2 illustrates the basic coding architecture of an H.264 encoder. In the video encoder of FIG. 2, input frames (200) for encoding are provided as one input of a motion estimation component (220), as one input of an intraframe prediction component (224), and to a positive input of a combiner (202) (e.g., adder or subtractor or the like). In one or more embodiments of the invention, to reduce memory bandwidth requirements, the input frames (200) may be stored in compressed format in a memory (not shown) and decompressed prior to being provided to the components of the video encoder. The compression and decompression of the input frames (200) is performed in accordance with methods for compression and decompression as described herein.

The frame storage component (218) provides reference data to the motion estimation component (220) and to the motion compensation component (222). The reference data may include one or more previously encoded and decoded frames. In some embodiments of the invention, to reduce memory bandwidth requirements, the reference data is compressed by the compression component (240) prior to storage in the frame storage component (218) and is decompressed by the decompression component (242) prior to being provided to the motion estimation component (220) and the motion compensation component (222). The compression component (240) performs compression in accordance with an embodiment of a method for compression as described herein and the decompression component (242) performs decompression in accordance with a method for decompression as described herein.

The motion estimation component (220) provides motion estimation information to the motion compensation component (222) and the entropy encoders (234). More specifically, the motion estimation component (220) performs tests based on the prediction modes defined in the H.264 standard to choose the best motion vector(s)/prediction mode. The motion estimation component (220) provides the selected motion vector (MV) or vectors and the selected prediction mode to the motion compensation component (222) and the selected motion vector (MV) to the entropy encoders (234).

The motion compensation component (222) provides motion compensated prediction information to a selector switch (226) that includes motion compensated interframe prediction macroblocks (MBs). The intraframe prediction component (224) also provides intraframe prediction information to switch (226) that includes intraframe prediction MBs and a prediction mode. That is, similar to the motion estimation component (220), the intraframe prediction component (224) performs tests based on prediction modes defined in the H.264 standard to choose the best prediction mode for generating the intraframe prediction MBs.

The switch (226) selects between the motion-compensated interframe prediction MBs from the motion compensation component (222) and the intraframe prediction MBs from the intraprediction component (224) based on the selected prediction mode. The output of the switch (226) (i.e., the selected prediction MB) is provided to a negative input of the combiner (202) and to a delay component (230). The output of the delay component (230) is provided to another combiner (i.e., an adder) (238). The combiner (202) subtracts the selected prediction MB from the current MB of the current input frame to provide a residual MB to the transform component (204). The resulting residual MB is a set of pixel difference values that quantify differences between pixel values of the original MB and the prediction MB. The transform component (204) performs a block transform such as DCT, on the residual MB to convert the residual pixel values to transform coefficients and outputs the transform coefficients.

The transform coefficients are provided to a quantization component (206) which outputs quantized transform coefficients. Because the DCT transform redistributes the energy of the residual signal into the frequency domain, the quantized transform coefficients are taken out of their raster-scan ordering and arranged by significance, generally beginning with the more significant coefficients followed by the less significant by a scan component (208). The ordered quantized transform coefficients provided via a scan component (208) are coded by the entropy encoder (234), which provides a compressed bitstream (236) for transmission or storage. The entropy coding performed by the entropy encoder (234) may be any suitable entropy encoding techniques, such as, for example, context adaptive variable length coding (CAVLC), context adaptive binary arithmetic coding (CABAC), run length coding, etc.

Inside every encoder is an embedded decoder. As any compliant decoder is expected to reconstruct an image from a compressed bitstream, the embedded decoder provides the same utility to the video encoder. Knowledge of the reconstructed input allows the video encoder to transmit the appropriate residual energy to compose subsequent frames. To determine the reconstructed input, i.e., reference data, the ordered quantized transform coefficients provided via the scan component (208) are returned to their original post-DCT arrangement by an inverse scan component (210), the output of which is provided to a dequantize component (212), which outputs estimated transformed information, i.e., an estimated or reconstructed version of the transform result from the transform component (204). The estimated transformed information is provided to the inverse transform component (214), which outputs estimated residual information which represents a reconstructed version of the residual MB. The reconstructed residual MB is provided to the combiner (238).

The combiner (238) adds the delayed selected predicted MB to the reconstructed residual MB to generate an unfiltered reconstructed MB, which becomes part of reconstructed frame information. The reconstructed frame information is provided via a buffer (228) to the intraframe prediction component (224) and to a filter component (216). The filter component (216) is a deblocking filter (e.g., per the H.264 specification) which filters the reconstructed frame information and provides filtered reconstructed frames, i.e., reference data or reference frames, to frame storage component (218). In some embodiments of the invention, the reconstructed frames are compressed by the compression component (240) in accordance with a compression method as described herein prior to providing them to the frame storage component (218).

Figure 3A:
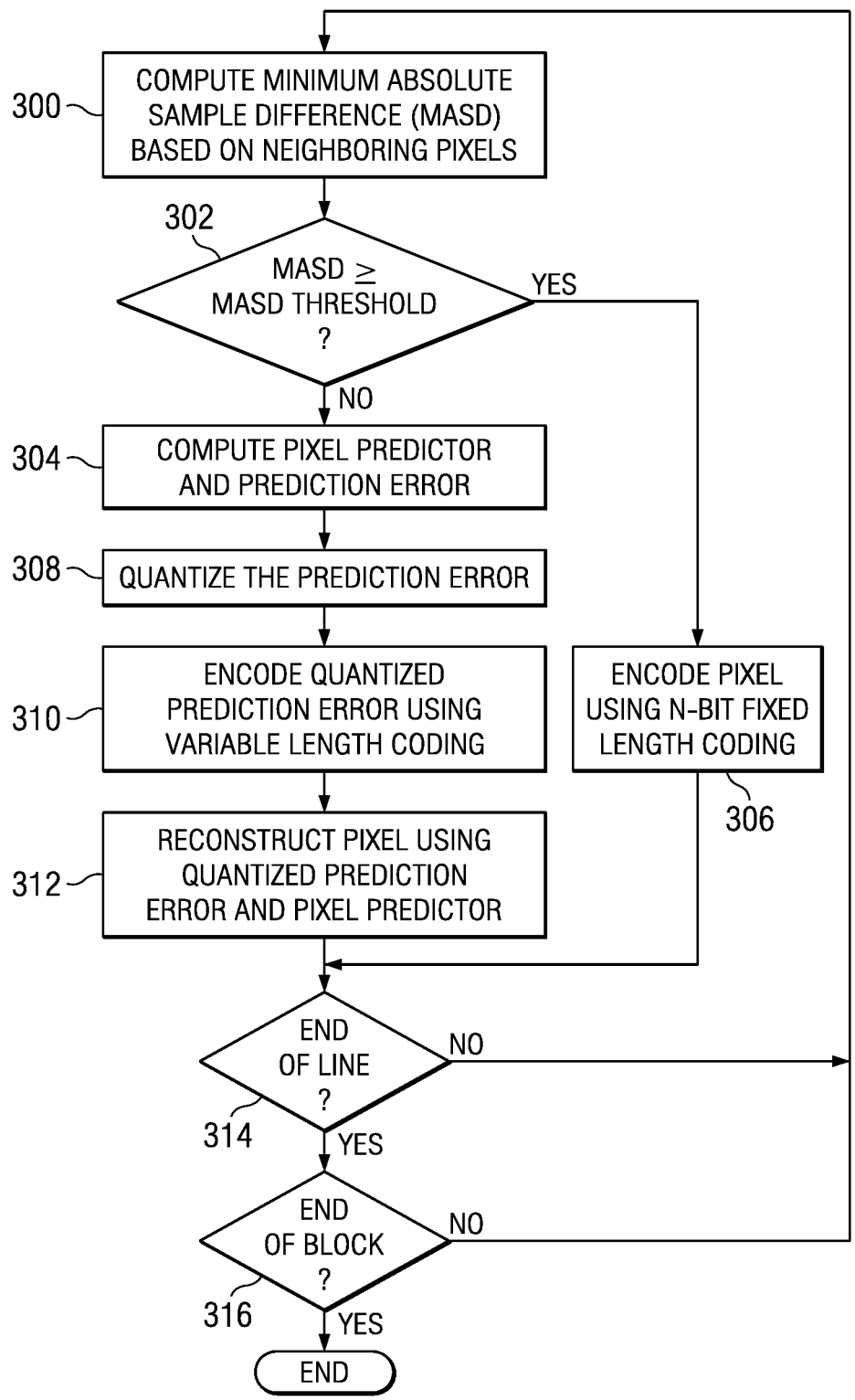
FIG. 3A shows a flow diagram of a method for digital image data compression in accordance with one or more embodiments of the invention.

FIG. 3A shows a flow diagram of a method for compression of a block of digital image data in accordance with one or more embodiments of the invention. Also, Table 1 below shows a pseudo code example of the method. The method is explained in reference to FIG. 3A, Table 1, and the example of FIG. 4. The method is performed in raster scan order on individual pixels in lines of pixels in the block of digital image data and may be used in lossless or lossy mode. Further, the method applied to each color component (e.g., Y, U, V, R, G, B, etc.) independently. In general, the method performs adaptive sample, i.e., pixel, spatial prediction, quantization, and adaptive fixed-length/variable length coding to compress each pixel.

Figure 4:
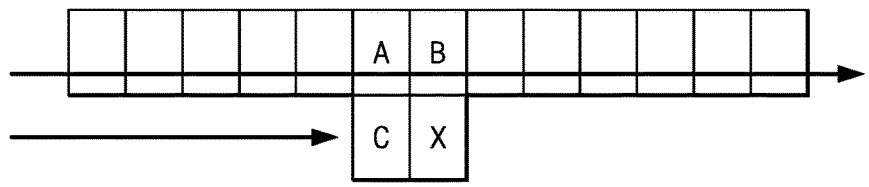
FIG. 4 shows an example of spatial prediction in accordance with one or more embodiments of the invention.

Initially, the minimum absolute sample difference (MASD) for a pixel to be compressed is computed based on neighboring reconstructed pixels (300). A reconstructed pixel is a pixel that has been previously encoded using this method and then reconstructed as described below. In one or more embodiments of the invention, as shown in the example of FIG. 4, the neighboring reconstructed pixels of a pixel to be encoded, i.e., pixel X, include the pixel to the immediate left in the same line, i.e., pixel C, the pixel immediately above in the previous line, i.e., pixel B, and the pixel immediately above and to the left in the previous line, i.e., pixel A. In some embodiments of the invention, if any of these neighboring reconstructed pixels are not available, then only the available neighboring reconstructed pixels are used for computing the MASD. In some embodiments of the invention, if any of these neighboring reconstructed pixels are not available, then a default value, e.g., 128, is used for the unavailable pixels. For example, neighboring reconstructed pixels in the previous line are not available for pixels in the first line of the digital image data. Similarly, the left neighboring reconstructed pixel for pixels at the beginning of a line of digital image data is not available.

As shown in line 1 of Table 1, to compute the MASD, three absolute sample differences (ASDs) are computed between combinations of the reconstructed neighboring pixels. More specifically, three ASDs are computed: the ASD between the top left reconstructed neighbor, i.e., pixel A, and the top reconstructed neighbor, i.e., pixel B, the ASD between the top left reconstructed neighbor, i.e., pixel A, and the left reconstructed neighbor, i.e., pixel C, and the ASD between the upper left reconstructed neighbor, i.e., pixel A, and an interpolated pixel value computed from the values of the top reconstructed neighbor, i.e., pixel B, and the left reconstructed neighbor, i.e., pixel C. The interpolated pixel value is computed as (B+C+1)/2. The MASD is then obtained by choosing the minimum value from the three ASDs.

The MASD is then compared to an MASD threshold (302) to decide whether to use fixed length or variable length coding (VLC). If the MASD is greater than or equal to the threshold, most likely the prediction error of the current pixel will also exceed this threshold and there will be no compression gain in encoding the current pixel using the VLC. If the MASD is greater than or equal to an MASD threshold (302), the pixel is encoded using N-bit fixed length lossless coding (306). As shown in line 2 of Table 1, in some embodiments of the invention, the MASD threshold is computed as $Q*2^{N-4}$ where N is the number of bits in the pixel (e.g., 8) and Q is the quantization parameter to be used for quantization if the MASD is not greater than or equal to the MASD threshold. As shown in line 2 of Table 1, after the lossless coding, the value of the reconstructed pixel is set to the value of the pixel. The compression then continues with the next pixel in the line if the end of the line has not been reached (314) or with the first pixel in the next line if the end of the block has not been reached (316).

If the MASD is less than the MASD threshold (302), the pixel is encoded using VLC. To encode the pixel, first a pixel predictor and the prediction error, i.e., pixel residual, is computed (304). As is shown in lines 4-6 of Table 1, the pixel predictor, referred to as Pred in the pseudo code, and the prediction error, referred to as DX in the pseudo code, is computed based on which ASD was selected as the MASD. If the ASD of the top left reconstructed neighbor, i.e., pixel A, and the left reconstructed neighbor, i.e., pixel C, is the MASD, then the prediction error is the difference between the current pixel i.e., pixel X, and the top reconstructed neighbor, i.e., pixel B, and the pixel predictor is the top reconstructed neighbor, i.e., pixel B. If the ASD of the top left reconstructed neighbor, i.e., pixel A, and the top reconstructed neighbor, i.e., pixel B, is the MASD, then the prediction error is the difference between the current pixel i.e., pixel X, and the left reconstructed neighbor, i.e., pixel C, and the pixel predictor is the left reconstructed neighbor, i.e., pixel C. If the ASD of the top left reconstructed neighbor, i.e., pixel A, and the interpolated pixel value is the MASD, then the prediction error is the difference between the current pixel, i.e., pixel X, and the interpolated pixel value and the pixel predictor is the interpolated pixel value.

After the pixel predictor and the prediction error are computed, the prediction error is quantized (308) and encoded using variable length coding (310). In one or more embodiments of the invention, as shown in line 7 of Table 1, the prediction error is quantized using linear quantization based on the quantization parameter used to determine the MASD threshold. The value of sign (DX) is 1 if DX>0; otherwise the value of sign (XDX)=−1. Also, as shown in line 8, the code used for the VLC is a signed exponential-Golomb (Exp-Golomb) code. Note that if the quantization parameter is 1, the coding is lossless. Otherwise, the coding is lossy. The signed Exp-Golomb code is shown in a compacted form in Table 2. Symbols $x_0, x_1, x_2 \ldots$ can take a value of 0 or 1. For example codeword $01x_0$ is a compact form for describing two code words: 010 corresponding to QDX=+1 and 011 corresponding to QDX=−1. No code table storage is needed when an Exp-Golomb code is used as the code words are regularly structured. Other suitable VLC codes may be used in embodiments of the invention.

After encoding, the pixel is reconstructed using the quantized pixel prediction error and the pixel predictor (312). In some embodiments of the invention, as shown in line 9 of Table 1, the pixel is reconstructed as the product of the quantized pixel prediction error and the quantization parameter added to the predictor for the pixel. Unless the current pixel is the last pixel in the line, the reconstructed pixel will be the left reconstructed neighbor for the next pixel in the line. The compression then continues with the next pixel in the line if the end of the line has not been reached (314) or with the first pixel in the next line if the end of the block has not been reached (316).

TABLE 1

```
1    MASD = min( abs(A–B), abs(A–C), abs(A – (B+C+1)/2) )
2    If (MASD >=Q*2^(N–4)) { put_bits(stream, N, X); recX = X;}
3    else {
4        if (MASD == abs(A–C)) { DX = X –B; Pred = B;}
5        else if (MASD == abs(A–B)) { DX = X–C; Pred = C;}
6        else { DX = X – (B+C+1)/2; Pred = (B+C+1)/2;}
7        QDX = sign(DX)*( (2*DX + Q) / (2Q));
8        SignedExpGlombCoding(stream, QDX);
9        recX = QDX *Q + Pred;
10   }
```

TABLE 2

| Codeword | Code number | QDX |
|---|---|---|
| 1 | 0 | 0 |
| 01$x_0$ | 1 ... 2 | ±1 |
| 001$x_1x_0$ | 3 ... 6 | ±2, ±3 |
| 0001$x_2x_1x_0$ | 7 ... 14 | ±4, ±5, ±6, ±7 |
| ... | k | $(-1)^{k+1}$ × ceil(k ÷ 2) |

Note:
Ceil(x) is the smallest integer greater than or equal to x

Figure 3B:
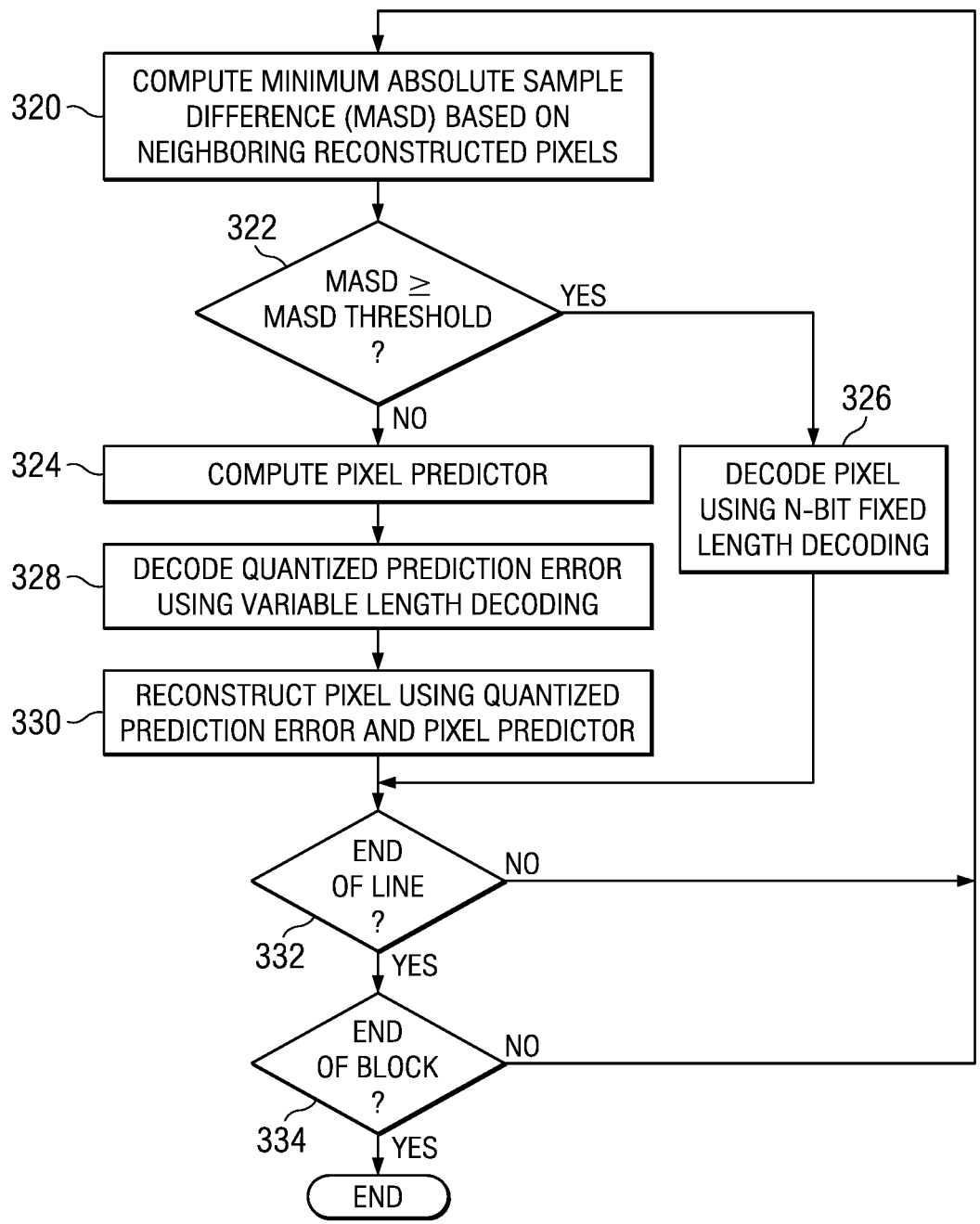
FIG. 3B shows a flow diagram of a method for digital image data decompression in accordance with one or more embodiments of the invention.

FIG. 3B shows a flow diagram of a method for decompression of a block of digital image data in accordance with one or more embodiments of the invention. Also, Table 3 below shows a pseudo code example of the method. The method is explained in reference to FIG. 3B, Table 3, and the example of FIG. 4. The decompression method essentially reverses the compression performed by the compression method of FIG. 3A. Initially, the minimum absolute sample difference (MASD) for a pixel to be decompressed is computed based on neighboring reconstructed pixels (320). A reconstructed pixel is a pixel that has been previously decoded using this method and then reconstructed as described below. The neighboring reconstructed pixels used for computing the MASD are the same as those used for encoding.

As shown in line 1 of Table 3, the MASD is computed as previously described. The MASD is then compared to an MASD threshold (322) to decide whether fixed length or variable length coding (VLC) was used to encode the pixel. The MASD threshold is the same as the MASD threshold used for encoding. If the MASD is greater than or equal to an MASD threshold (322), the pixel was encoded using N-bit fixed length lossless coding and is thus decoded using N-bit fixed length decoding (326). As shown in line 2 of Table 3, after the decoding, the value of the reconstructed pixel is set to the value of the decoded pixel. The decompression then continues with the next pixel in the line if the end of the line has not been reached (332) or with the first pixel in the next line if the end of the block has not been reached (334).

If the MASD is less than the MASD threshold (322), the pixel was encoded using VLC. To decode the pixel, first a pixel predictor is computed (324). As is shown in lines 4-6 of Table 3, the pixel predictor, referred to as Pred in the pseudo code, is computed based on which ASD was selected as the MASD. If the ASD of the top left reconstructed neighbor, i.e., pixel A, and the left reconstructed neighbor, i.e., pixel C, is the MASD, then the pixel predictor is the top reconstructed neighbor, i.e., pixel B. If the ASD of the top left reconstructed neighbor, i.e., pixel A, and the top reconstructed neighbor, i.e., pixel B, is the MASD, then the pixel predictor is the left reconstructed neighbor, i.e., pixel C. If the ASD of the top left reconstructed neighbor, i.e., pixel A, and the interpolated pixel value is the MASD, then the pixel predictor is the interpolated pixel value.

After the pixel predictor is computed, the quantized pixel prediction error is decoded using the same variable length coding used for encoding (328). In one or more embodiments of the invention, as shown in line 7 of Table 3, the code used for the VLC is a signed Exp-Golomb code. After decoding, the pixel is reconstructed using the decoded quantized pixel prediction error and the pixel predictor (312). In some embodiments of the invention, as shown in line 9 of Table 1, the pixel is reconstructed as the product of the decoded quantized pixel error and the quantization parameter used to quantize the pixel prediction error prior to encoding added to the predictor for the pixel. Unless the current pixel is the last pixel in the line, the reconstructed pixel will be the left reconstructed neighbor for the next pixel in the line. The decompression then continues with the next pixel in the line if the end of the line has not been reached (332) or with the first pixel in the next line if the end of the block has not been reached (334).

TABLE 3

```
1    MASD = min( abs(A–B), abs(A–C), abs(A – (B+C+1)/2) )
2    If (MASD >=Q*2^(N–4)) recX = read_bits(stream, N);
3    else {
4        if (MASD == abs(A–C)) Pred = B;
5        else if (MASD == abs(A–B)) Pred = C;
6        else Pred = (B+C+1)/2;
7        QDX = SignedExpGlombDecoding(stream);
8        recX = QDX *Q + Pred;
9    }
```

In one or more embodiments of the invention, to reduce memory bandwidth requirements, the above method for compression may be used to compress digital image data for storage in an external memory, i.e., an off-chip memory, after the frames are captured and some initial image processing is performed to prepare the frames for encoding by a video encoder. The above method for decompression is then used to decompress the stored frames prior to processing by the video encoder. Video encoding is generally macroblock based. For example, a macroblock may be a 16×16 luminance area and corresponding chrominance area of two chrominance components (for chroma format 4:2:0, chrominance area size is 8×8). If the compressed digital image data is stored in memory in the coding order, i.e., line by line raster scan order, the video encoder may need to first retrieve sufficient compressed data from the external memory to decompress the digital image data for a complete row of macroblocks before being able to start actual video compression. Because on-chip memory is limited in some embedded applications, the video encoder may not be able to buffer the entire decompressed row of macroblocks in on-chip memory (especially when video resolution is D1 and above), and would thus have to store the decompressed macroblocks back in the external memory. The video encoder would then be required to read the decompressed macroblocks back from the external memory, thus negating any memory bandwidth reduction gained by performing the compression.

Figure 5:
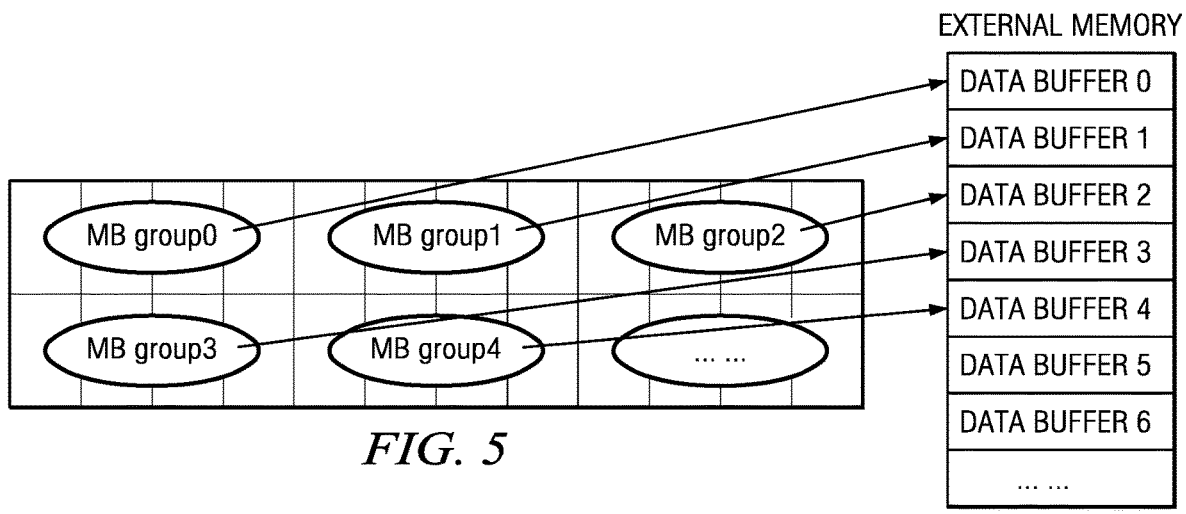
FIG. 5 shows an example of storage of compressed digital image data in accordance with one or more embodiments of the invention.

Accordingly, in some embodiments of the invention, as shown in FIG. 5, the compressed digital image data is stored in the external memory in macroblock (MB) group order. As shown in FIG. 5, a frame is divided into macroblock groups that include a number of macroblocks. The size of a macroblock group is determined based on the burst size of the external memory and the on-chip memory storage capacity and is selected such that an entire macroblock group may be stored in the on-chip memory after decompression. As is shown in FIG. 5, each MB group is stored in a separate data buffer in the external memory.

The digital image data is compressed line by line in raster scan order, but each line is divided into sub-lines according to the MB group partitioning. The length of each sub-line is exactly the horizontal length of a macroblock group. After each sub-line is compressed, the resulting compressed data is written to the data buffer in the external memory corresponding to the MB group to which the sub-line belongs. The luminance and chrominance components are compressed independently and the resulting compressed data may be interleaved before storage. Within each MB group, the compressed data is written into the corresponding data buffer in external memory in a raster scan order. In one or more embodiments of the invention, the size of a data buffer is the same as the size of an uncompressed MB group. In some embodiments of the invention, the amount of compressed data in each data buffer is made available to the video encoder.

During video encoding, the encoder loads the compressed data MB group by MB group from the external memory based on the amount of compressed data in the corresponding data buffers. That is, the encoder loads the compressed data for a MB group in the on-chip memory, decompresses the data, stores the decompressed MB group data in the on-chip memory, and then encodes the decompressed MB group data. After all the MBs of the MB group are encoded, the encoder then loads, decompresses, and encodes the next group of compressed data. This process is repeated until the entire frame is encoded.

The performance of an embodiment of the above-described compression method was tested in laboratory simulations for both lossy and lossless compression. For the tests, the first ten frames of four representative D1 (704×480, progressive scan, 4:2:0) sequences were encoded using the compression method with Q=3 (lossy) and Q=1 (lossless). For comparison of the lossy compression, the same sequences were encoded using the H.264 I-frame only encoder (with RD-optimization on and Context Adaptive Variable Length Coding). The results for Q=3 and the H.264 encoder are summarized in Table 4 and the results for Q=1 are summarized in Table 5. The compression ratio is the ratio between the original Y, U or V picture size and its compressed picture size. The overall compression ratio is the ratio between the total Y, U, V picture size and the total compressed picture size.

As shown in Table 4, the compression ratio is highly content dependent and varies from sequence to sequence. At a picture quality of approximately 50 dB, the compression method compresses picture data at an overall compression ratio from 1.59 to 3.83, while the H.264 I-frame only encoder, which is perhaps 1000 times more complex than the compression method in terms of memory requirements and computational complexity, provides an overall compression ratio from 1.90 to 5.38. As shown in Table 5, in the lossless case, the compression method provides an overall compression ratio from 1.20 to 2.44.

TABLE 4

| | Compression Method (Q = 3) | | | H.264 I-frame only (qp = 12) | |
|---|---|---|---|---|---|
| Sequence | PSNR (Y, U, V) [dB] | Compression ratio (Y, U, V) | Overall compression ratio | PSNR (Y, U, V) [dB] | Overall compression ratio |
| Mobile | 49.95, 49.84, 49.87 | 1.75, 3.10, 3.15 | 2.06 | 50.00, 49.68, 49.72 | 2.12 |
| Football | 49.90, 50.12, 50.00 | 3.28, 4.29, 5.05 | 3.67 | 49.85, 49.93, 50.47 | 4.49 |
| Tennis | 50.11, 49.82, 49.97 | 1.21, 4.16, 4.31 | 1.59 | 50.11, 49.77, 49.95 | 1.90 |
| HarryPotter | 50.77, 50.30, 50.24 | 3.49, 4.42, 5.19 | 3.83 | 50.81, 50.46, 51.38 | 5.38 |

TABLE 5

| | Compression Method (Q = 1) | |
|---|---|---|
| Sequence | Compression ratio (Y, U, V) | Overall compression ratio |
| Mobile | 1.18, 1.90, 1.94 | 1.36 |
| Football | 1.92, 2.73, 3.20 | 2.17 |
| Tennis | 0.95, 2.46, 2.57 | 1.20 |
| HarryPotter | 2.22, 2.75, 3.46 | 2.44 |

Figure 6A:
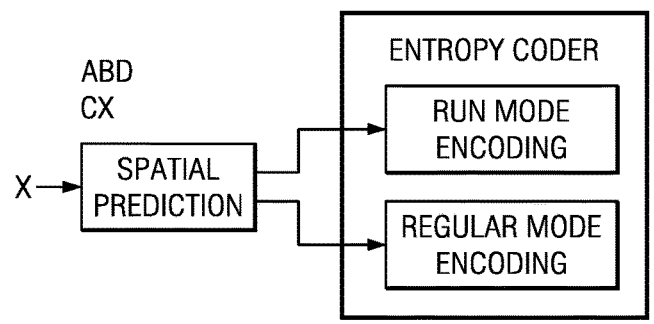
FIGS. 6A, 6B, and 6C show flow diagrams of a method for digital image data compression in accordance with one or more embodiments of the invention.
Figure 6B:
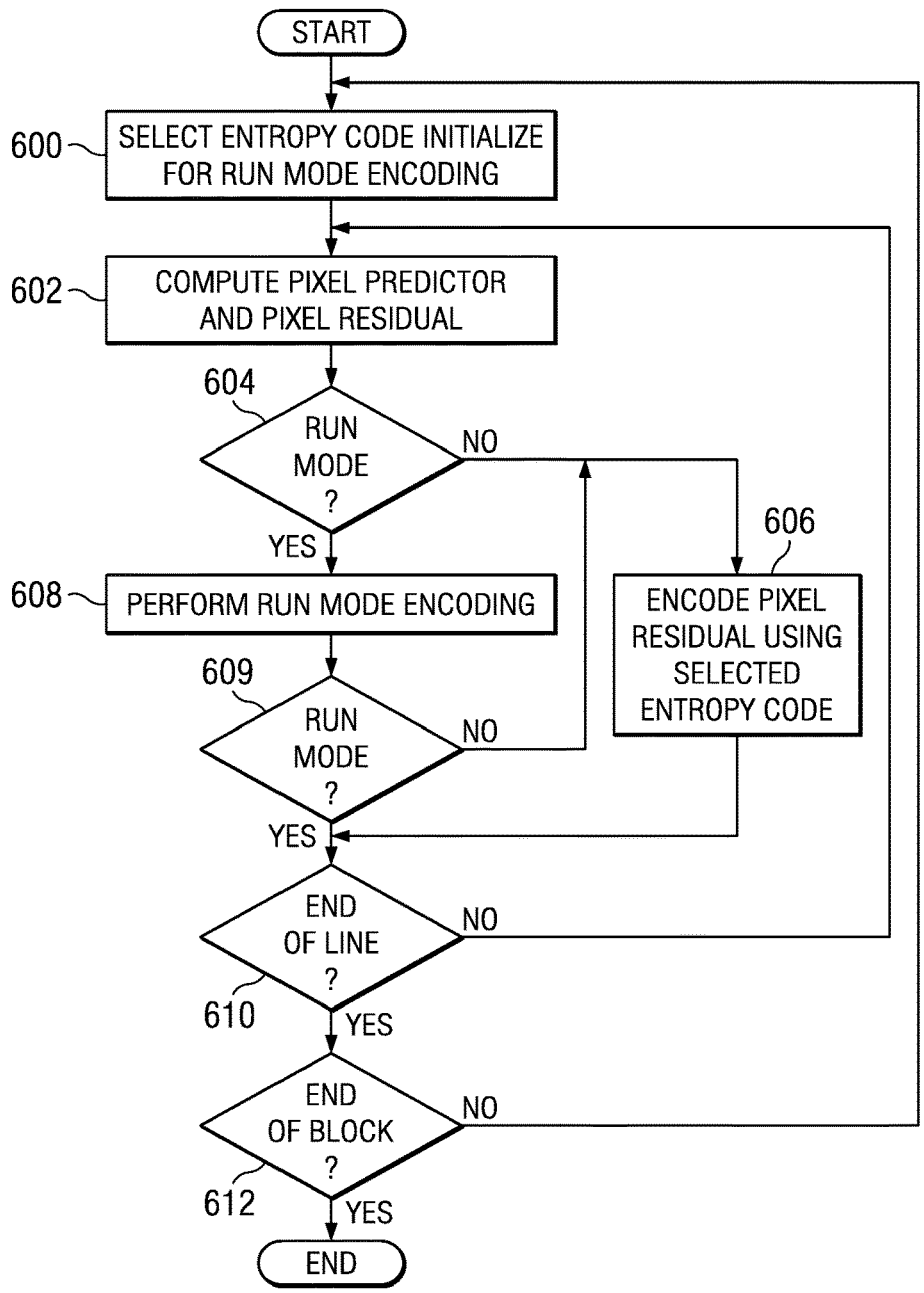
Figure 6C:
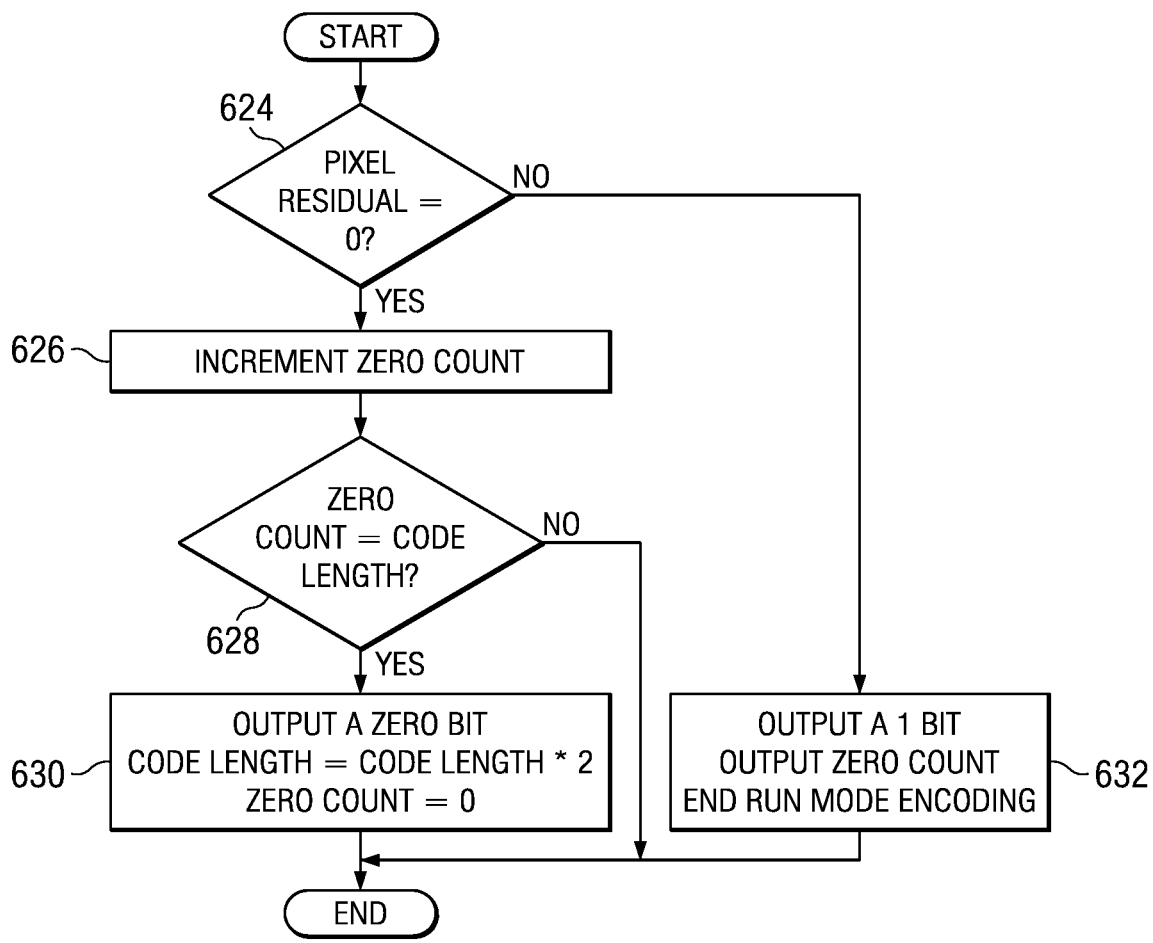

FIGS. 6A, 6B, and 6C show flow diagrams of a method for lossless compression of a block of digital image data in accordance with one or more embodiments of the invention. In addition, Tables 8 and 10 are pseudo code of portions of the compression method in accordance with one or more embodiments of the invention. The method is explained in reference to FIGS. 6A, 6B, 6C, the pseudo code of Tables 8 and 10, and the example of FIG. 7. The method is performed in raster scan order on individual pixels in lines of pixels in the block of digital image data. Further, the method applied to each color component (e.g., Y, U, V, R, G, B, etc.) independently. In general, as shown in FIG. 6A, the method performs adaptive spatial prediction for a pixel, i.e., X, based on neighboring pixels, i.e., A, B, and C, to determine a pixel residual, and then encodes the residual using adaptive variable length coding to compress the pixel. As is explained in more detail below, if the residual is 0, the residual may be encoded using run mode encoding under certain conditions. In general, run mode encoding is a technique for encoding a consecutive sequence of zero value pixel residuals in a single code word. Otherwise, the residual is encoded using regular mode entropy encoding.

As shown in FIG. 6B, at the beginning of each line in the block of digital image data, an entropy code is selected for use during regular mode encoding and some initialization is performed for run mode encoding (600). The initialization may include setting a flag, e.g., the runMode flag of Table 8, to indicate that run mode is not currently active. The entropy code for regular mode encoding is selected based on the probability distribution of the pixel residuals, i.e., a code with a probability distribution that best matches the probability distribution of the pixel residual distributions is chosen. In one or more embodiments of the invention, the entropy code is selected from some number of entropy codes that are empirically chosen for a particular embodiment. The number of empirically selected entropy codes available for selection depends on the implementation. The selected entropy code is signaled in the bit stream of compressed digital image data prior to the compressed digital image data in the line. In other words, when an entropy code is selected for a line, an indicator for the selected entropy code is included in the compressed digital image data to inform a decoder of which entropy code to use for decoding the line.

In one or more embodiments of the invention, the entropy codes provided for selection include some combination of Golomb codes and exponential Golomb (exp-Golomb) codes. These particular well-known code types are used at least because they are simple to encode and decode, they have static codebooks, i.e., they may be directly calculated so no lookup table is needed, and the codebooks match well with the pixel residual probability distributions of a representative sample set of digital video sequences. Further, as is explained in more detail below, these codes provide a good compression ratio at fairly low complexity.

Golomb and exp-Golomb codes are entropy codes that are indexed by a non-negative integer value referred to as an "order." Both code types include non-negative integers as their symbol alphabets. Furthermore, both code types output three part code words that include a unary prefix of zero bits, a binary suffix, and a separator between the prefix and suffix that is a single 1 bit. Thus, if the prefix of a codeword is q bits long, the separator is a single bit and the suffix is k bits long, the length of the codeword is q+k+1.

To encode a non-negative integer n using a Golomb code of order m, the quotient q and remainder r of n with respect to $2^m$ is calculated as shown in Eq. (1) and Eq. (2), respectively. Note that r corresponds to the m least-significant bits of the binary representation of n, and q corresponds to the other, most-significant, bits. The codeword for n consists of a prefix of q zero bits, the single one bit separator, and a suffix of m bits containing the binary representation of r. Table 6 shows Golomb code tables for m=0, m=1, m=2, and m=3. Further, the length of the codeword for n is q+1+m.

$$q = n \gg m \qquad (1)$$

$$r = n - q*2^m \qquad (2)$$

TABLE 6

| | Codeword | Range of n |
|---|---|---|
| m = 0 | 1 | 0 |
| | 0 1 | 1 |
| | 0 0 1 | 2 |
| | 0 0 0 1 | 3 |
| | . . . | . . . |
| m = 1 | 1 $x_0$ | 0~1 |

TABLE 6-continued

| | Codeword | Range of n |
|---|---|---|
| | 0 1 $x_0$ | 2~3 |
| | 0 0 1 $x_0$ | 4~5 |
| | 0 0 0 1 $x_0$ | 6~7 |
| | . . . | . . . |
| m = 2 | 1 $x_1 x_0$ | 0~3 |
| | 0 1 $x_1 x_0$ | 4~7 |
| | 0 0 1 $x_1 x_0$ | 8~11 |
| | 0 0 0 1 $x_1 x_0$ | 12~15 |
| | . . . | . . . |
| m = 3 | 1 $x_2 x_1 x_0$ | 0~7 |
| | 0 1 $x_2 x_1 x_0$ | 8~15 |
| | 0 0 1 $x_2 x_1 x_0$ | 16~23 |
| | 0 0 0 1 $x_2 x_1 x_0$ | 24~31 |
| | . . . | . . . |

The exp-Golomb codes are slightly more complex. To encode a non-negative integer n using an exp-Golomb code of order k, the number of zero bits q in the prefix of the codeword may be calculated as shown in Eq. (3) and the value r of the suffix may be calculated as shown in Eq. (4). The length of the suffix is q+k. The codeword for n consists of a prefix q zero bits, the single one bit separator, and a suffix of q+k bits containing the binary representation of r. The codeword may also be obtained directly as the binary representation of the sum $n+2^k$, zero-extended by q bits. Table 7 shows exp-Golomb code tables for k=0, k=1, k=2, and k=3. Further, the length of the codeword for n is 2q+k+1.

$$q = \log_2((n+2^k) \gg k) \qquad (3)$$

$$r = n + 2^k - 2^{n+k} \qquad (4)$$

TABLE 7

| | Codeword | Range of n |
|---|---|---|
| k = 0 | 1 | 0 |
| | 0 1 $x_0$ | 1~2 |
| | 0 0 1 $x_1 x_0$ | 3~6 |
| | 0 0 0 1 $x_2 x_1 x_0$ | 7~14 |
| | . . . | . . . |
| k = 1 | 1 $x_0$ | 0~1 |
| | 0 1 $x_1 x_0$ | 2~5 |
| | 0 0 1 $x_2 x_1 x_0$ | 6~13 |
| | 0 0 0 1 $x_3 x_2 x_1 x_0$ | 14~29 |
| | . . . | . . . |
| k = 2 | 1 $x_1 x_0$ | 0~3 |
| | 0 1 $x_2 x_1 x_0$ | 4~11 |
| | 0 0 1 $x_3 x_2 x_1 x_0$ | 12~27 |
| | 0 0 0 1 $x_4 x_3 x_2 x_1 x_0$ | 28~59 |
| | . . . | . . . |
| k = 3 | 1 $x_2 x_1 x_0$ | 0~7 |
| | 0 1 $x_3 x_2 x_1 x_0$ | 8~23 |
| | 0 0 1 $x_4 x_3 x_2 x_1 x_0$ | 24~55 |
| | 0 0 0 1 $x_5 x_4 x_3 x_2 x_1 x_0$ | 56~119 |
| | . . . | . . . |

Referring again to FIG. 6B, in one or more embodiments of the invention, the entropy code to be used for regular mode encoding is selected by performing enough of the encoding process on the line of pixels using each of the provided entropy codes for regular mode encoding to determine which of the entropy codes produce the best compression. More specifically, a residual is computed for each pixel and then either regular mode encoding or run mode encoding of the residual is selected as described in more detail below. If run mode encoding is selected, sufficient processing is performed to move the process to the next pixel in the line without encoding the residual. If regular mode encoding is selected, the length of the codeword for the pixel residual is computed for each entropy code and added to a bit count for each entropy code. After all pixels in the line are processed, the entropy code that generated the smallest bit count is selected for use in regular mode encoding. This approach for selecting the entropy code is referred to herein as the two-pass approach.

In some embodiments of the invention, the entropy code to be used for regular mode encoding is selected as the entropy code that would have produced the best compression for the previous line of pixels. More specifically, as the previous line of pixels is encoded, when regular mode encoding is selected for a pixel residual, the length of the codeword for the pixel residual is computed for each available entropy code and added to a bit count for the entropy code. The entropy code with the smallest bit count is then selected for use in regular mode encoding of the next line of pixels. In these latter embodiments, if a line of pixels is the first line of pixels in the digital image data, the entropy code used for regular mode encoding may be a default entropy code, may be selected by encoding the line of pixels using each of the entropy codes as previously described, etc. This approach for selecting the entropy code is referred to herein as the one-pass approach.

Figure 7:
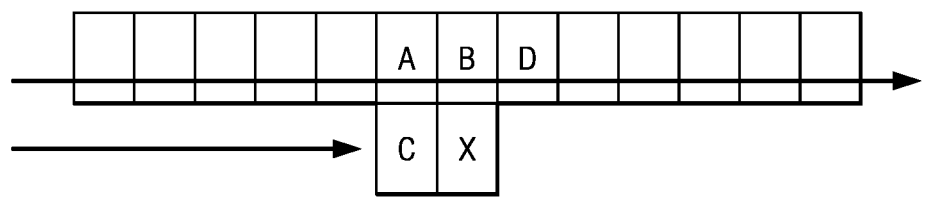
FIG. 7 shows an example of spatial prediction in accordance with one or more embodiments of the invention.

Once the initialization is performed and the entropy code is selected (600), each of the pixels in the line is encoded. First, a pixel predictor and a pixel residual, i.e., prediction error, are computed for a pixel (602) using spatial prediction. The computation of the pixel predictor and pixel residual is similar to that described above in relation to FIG. 3A. First, the minimum absolute sample difference (MASD) for the pixel is computed based on neighboring pixels. In one or more embodiments of the invention, as shown in the example of FIG. 7, the neighboring pixels of a pixel to be encoded, i.e., pixel X, include the pixel to the immediate left in the same line, i.e., pixel C, the pixel immediately above in the previous line, i.e., pixel B, and the pixel immediately above and to the left in the previous line, i.e., pixel A. In some embodiments of the invention, if any of these neighboring pixels are not available, then only the available neighboring pixels are used for computing the MASD. In some embodiments of the invention, if any of these neighboring pixels are not available, then a default value, e.g., 128, is used for the unavailable pixels.

To compute the MASD, three absolute sample differences (ASDs) are computed between combinations of the neighboring pixels. More specifically, three ASDs are computed: the ASD between the top left neighbor, i.e., pixel A, and the top neighbor, i.e., pixel B, the ASD between the top left neighbor, i.e., pixel A, and the left neighbor, i.e., pixel C, and the ASD between the top left neighbor, i.e., pixel A, and an interpolated pixel value computed from the values of the top neighbor, i.e., pixel B, and the left neighbor, i.e., pixel C. The interpolated pixel value is computed as (B+C)/2. The MASD is then obtained by choosing the minimum value from the three ASDs.

The pixel predictor and the pixel residual are then computed based on which ASD was selected as the MASD. If the ASD of the top left neighbor, i.e., pixel A, and the left neighbor, i.e., pixel C, is the MASD, then the pixel residual is the difference between the current pixel i.e., pixel X, and the top neighbor, i.e., pixel B, and the pixel predictor is the top neighbor, i.e., pixel B. If the ASD of the top left neighbor, i.e., pixel A, and the top neighbor, i.e., pixel B, is the MASD, then the pixel residual is the difference between the current pixel i.e., pixel X, and the left neighbor, i.e., pixel C, and the pixel predictor is the left neighbor, i.e., pixel C.

If the ASD of the top left neighbor, i.e., pixel A, and the interpolated pixel value is the MASD, then the prediction error is the difference between the current pixel, i.e., pixel X, and the interpolated pixel value and the pixel predictor is the interpolated pixel value.

Once the pixel predictor and pixel residual are computed (602), a check is made to determine if run mode is currently active or if run mode is not currently active, whether or not run mode should be entered (604). If run mode is currently active, then run mode encoding is performed for the pixel (608). As shown in line 17 of Table 8, determining if run mode is active may include checking a flag, e.g., runMode. If run mode is not currently active, then a check is made to determine if run mode should be activated for the pixel. In one or more embodiments of the invention, if the pixel residual of the previous pixel, i.e., the left neighbor (pixel C in FIG. 7), is 0 and selected neighboring pixels have the same value, run mode is activated.

In some embodiments of the invention, the neighboring pixels considered are the top left neighbor, i.e., pixel A, the top neighbor, i.e., pixel B, the top right neighbor, i.e., pixel D, and the left neighbor, i.e., pixel C. In some embodiments, if the pixel residual of C is 0 and A=B=C=D, then run mode is activated. Alternatively, in some embodiments, run mode is activated if the pixel residual of C is 0 and A=C. Alternatively, in some embodiments, run mode is activated if the pixel residual of C is 0 and A=B=D. Lines 9 and 10 of Table 8 are an example of determining whether or not run mode is to be activated. In some embodiments of the invention, if a neighbor is not available, the value is assumed to be 128. In some embodiments of the invention, if a neighbor is not available, the value may be assumed to be any reasonable value or may be ignored for purposed of the determination. If run mode is to activated, then an indicator that run mode is active is set, e.g., the runMode flag of Table 8, and some initialization for run mode encoding is performed. As shown in lines 12-14 of Table 8, this initialization may include setting the initial code length (codeLength) for coding a run of zero residual values to two, and setting the count of the number of zero residual values encoded (zeroRunLength) to 0. The use of the code length and the count of zero residual values are explained in more detail below in reference to FIG. 6C.

If run mode is active or activated (604), the pixel is encoded by performing run mode encoding (608). In run mode encoding, runs, i.e., consecutive sequences of zero value pixels residuals are encoded in a single codeword. FIG. 6C shows a flow diagram of a method for run mode encoding in accordance with one or more embodiments of the invention. If the pixel residual of the current pixel is 0 (624), then the count of the number of consecutive pixel residuals having a value of zero is incremented (626). If this count is equal to the current code length (628), then a zero value bit is output (630) as the encoding of a consecutive sequence of zero value residuals of length code length. For example, if the code length is two, the zero value bit represent a run of two consecutive zero value residuals. In addition, the code length is doubled and the zero count is reset to 0 (630). The encoding then continues with the next step in FIG. 6B. If the count of the number of consecutive zero value pixel residuals is not equal to the code length (628), then the encoding continues with the next step in FIG. 6B.

If the pixel residual of the current pixel is not zero (624), then run mode encoding is terminated and the pixel residual will be encoded using regular mode encoding. First a bit with a value of one is output to indicate the end of a run (632). Then, the current count of the number of consecutive zero value pixel residuals is output as a binary number of length of $\log_2$(code length), and run mode encoding is ended (632). In one or more embodiments of the invention, ending run mode includes setting an indicator that run mode is not active, e.g., the runMode flag of Table 8. After run mode encoding is terminated, encoding continues with the next step in FIG. 6B.

The result of run mode encoding is that a consecutive sequence of zero value pixel residuals in a line of pixels is encoded as a code word with unary prefix having some number of zero value bits, a binary suffix, and a separator between the prefix and suffix that is a single 1 bit. Each zero value bit in the prefix represents a subset, i.e., run, of the consecutive sequence of zero value pixel residuals where the size of the subset is a power of two. More specifically, the first zero value bit in the prefix represents the first two zero value pixel residuals in the sequence, the second zero value bit in the prefix represents the next four zero value pixel residuals in the sequence, etc. The separator, i.e., the one bit, signals that the sequence is ending, i.e., that a non-zero pixel residual is coming up following the suffix. The suffix is a binary number indicating how many additional zero value pixel residuals are in the sequence prior to the non-zero pixel residual. That is, the suffix encodes the remaining zero value pixels in the sequence. The length of the suffix, i.e., the number of bits in the suffix, is $\log_2(L)$ where L is the length of the subset that was being encoded when the non-zero pixel residual was encountered.

Said another way, the code word has a unary prefix of N zero value bits representing N consecutive subsets, i.e., runs, of the consecutive sequence of zero value pixel residuals, a binary suffix of length $\log_2(N+1)$ bits, and a single one value bit between the unary prefix and the binary suffix. Each bit position n=1 to N in the unary prefix encodes an nth subset of length $2^n$ of the N consecutive subsets. The binary suffix is a binary number indicating a number M of zero value pixel residuals in the (N+1)th consecutive subset of the consecutive sequence, wherein M<N+1.

For example, if the sequence of pixel residuals is 00,0000, 000002, the resulting code word will be 001101. In this code word, the prefix is 00 and the suffix is 101. The first 0 bit in the prefix represents the first two zero value pixel residuals in the sequence, the second 0 bit in the prefix represents the next four zero value pixel residuals in the sequence, the first 1 bit is the separator that signals that the next eight residuals are not all zeros, and the next three bits, i.e., the suffix 101, and indicate that there five leading zeros in the next eight residuals. The nonzero pixel residual 2 in this example will be encoded with regular mode encoding.

Table 8 is pseudo code of a method for run mode encoding in accordance with one or more embodiments of the invention. The pseudo code is expressed using the C programming language and will be understood by one of ordinary skill in the art based on the above description of FIG. 6C and the comments in the pseudo code.

TABLE 8

```
1    // set runMode flag at the beginning of each line
2    // prevResidual -> residual of previous pixel
3    // pixelIdx => pixel index
4    // width => number of pixels in a line
5    residual = SpatialPrediction(A, B, C, D, X);
6       // check if coding enters the zero run coding mode
7       // note once enters the zero run coding, this check is no longer performed
8       // zero run coding mode exits when the next residual is non-zero
9       if (runMode == 0 && pixelIdx > 0 && prevResidual == 0 && (A == B)
10         && (A == C) && (A == D)) {
11         runMode = 1; // turn on zero run coding flag
12         codeLength = 2; // set the initial code length
13         g = 1; // g = log2(L)
14         zeroRunLength = 0; // set zero run length to zero
15      }
16   /****** Zero run mode coding ******/
17      if (runMode) {
18         /**** coding for the residual = 0 case      ****/
19         if (residual == 0) {
20            zeroRunLength++; // add the zero run length by one
21            if (zeroRunLength == codeLength) {
22              // if zero run length equals codeLength, insert one-bit 0 into bit stream
23              // and double the length
24              put_bits(stream, 1, 0);
25              zeroRunLength = 0;
26              codeLength <<= 1;
27              g++;
28            } else if (pixelIdx == width - 1) { // force exit because of end of line
29              // if the current pixel is the last pixel of the line
30              // insert one-bit zero into the bit stream and exit
31              put_bits(stream, 1, 0);
32            }
33         } else {
34            /**** coding for residual != 0 case, ends run mode encoding ***/
35            put_bits(stream, 1, 1); // put one-bit one in bit stream to indicate end of run mode
36            put_bits(stream, g, zeroRunLength); // encoding the remaining value of zero run
37            mapmode = 2; // set mapping mode to 2 for the 1st residual after run mode
38                         // note that the 1st residual after zero run coding will never be zero
39            runMode = 0; // turn off the run mode encoding
40         }
41      }
```

Referring again to FIG. 6B, after run mode encoding is performed (608), a check is made to determine if run mode encoding was deactivated (609). As previously mentioned, run mode encoding is ended if the value of the current pixel residual is not zero. If run mode encoding was not deactivated (609), the encoding continues with the next pixel in the line (610) or with the first pixel in the next line (612) unless the end of the block has been reached.

If run mode encoding was deactivated (609), or if run mode was not active or activated (604), the pixel residual is encoded using the selected entropy code. First, the signed pixel residual is mapped to unsigned code number using a suitable mapping function. In one or more embodiments of the invention, the mapping is performed in accordance with Table 9. After mapping, the code number is encoded using the selected entropy code. After the pixel residual is encoded using the selected entropy code (606), the encoding continues with the next pixel in the line (610) or with the first pixel in the next line (612) unless the end of the block has been reached.

TABLE 9

| Code Number | Residual |
|---|---|
| 0 | 0 |
| 1 | 1 |
| 2 | −1 |

TABLE 9-continued

| Code Number | Residual |
|---|---|
| 3 | 2 |
| 4 | −2 |
| 5 | 3 |
| 6 | −3 |
| r | $(-1)^{r+1} \times \text{Ceil}(r \div 2)$ |

Table 10 is pseudo code of a method for regular mode encoding of a pixel residual in accordance with one or more embodiments of the invention. The pseudo code is expressed using the C programming language and will be understood by one of ordinary skill in the art based on the above description of FIG. 6B and the comments in the pseudo code. The method of Table 10 assumes that the previously described one-pass approach for selecting the entropy code is used. In the pseudo code, ks is the currently selected entropy code, KMAX is the maximum order of the Exp-Golomb codes from which a code selection may be made, and MMAX is the maximum order of the Golomb codes from a code selection may be made. Further, in the pseudo code, an optimization is used to take advantage of the fact that the first pixel residual after the end of run mode coding will always be non-zero. For this optimization, the code table of Table 9 is shifted up by 1, i.e., code number 0 corresponds to a pixel residual=1, code number 1 corresponds to a pixel residual=−1, etc. The flag mapmode is used to control use of the optimization.

TABLE 10

```
1   Void RegularEntropyCoding (
2       Bitstream * stream,  // bit stream pointer
3       S16 residual,     // pixel residual after spatial predication
4       S16 ks,           // selected index: 0 ~ KMAX−1 Exp-Golomb codes,
5                         // KMAX ~ KMAX+MMAX −1 => Golomb codes
6       S08 mapmode,      // mapping residual to codeNum mode 1 or 2
7                         // for the first non-zero residual after the zero run coding
8                         // mapmode = 2 because this residual is always non-zero
9       S32 * bitsNum)    // array to accumulate number of bits used by different codes
10  {
11      S16 n, buf, CodeNum, k;
12      S16 m, q;
13      U16 infoCode; // suffix of a code word
14      // map the residual to unsigned coding number
15      CodeNum = 2 * abs(residual) − mapmode;
16      if (residual >= 0) CodeNum++;
17      // loop through the KMAX Exp-Golomb codes to count number of bits
18      // encode the residual if the selected code ks is one of Exp-Golomb codes
19      for (k = 0; k < KMAX; k++) {
20          // compute used number of bits
21          buf = (CodeNum + (1<<k) )>> k;
22          n = numberofLeadZeroBits(buf);
23          bitsNum[k] += (2 * n + 1 + k);
24          // encoding for selected Exp-Golomb code
25          if (k == ks) {
26              infoCode = CodeNum + (1<<k) − (1 << (n + k));
27              put_bits(stream, n+1, 1);
28              if (n + k)
29                  put_bits(stream, n + k, infoCode);
30          }
31      }
32      // loop through the MMAX Golomb codes to count number of bits
33      // encode the residual if the selected code ks is one of Golomb codes
34      for (m = 0; m < MMAX; m++) {
35          // compute used number of bits
36          q = CodeNum >> m;
37          bitsNum[m + KMAX] += q + 1 + m;
38          // encoding for selected Golomb code
39          if (m == ks − KMAX) {
40              infoCode = CodeNum − q * (1 << m);
```

TABLE 10-continued

```
41        put_bits(stream, (q + 1), 1);
42        if (m) put_bits(stream, m, infoCode);
43      }
44    }
45  }
```

Figure 6D:
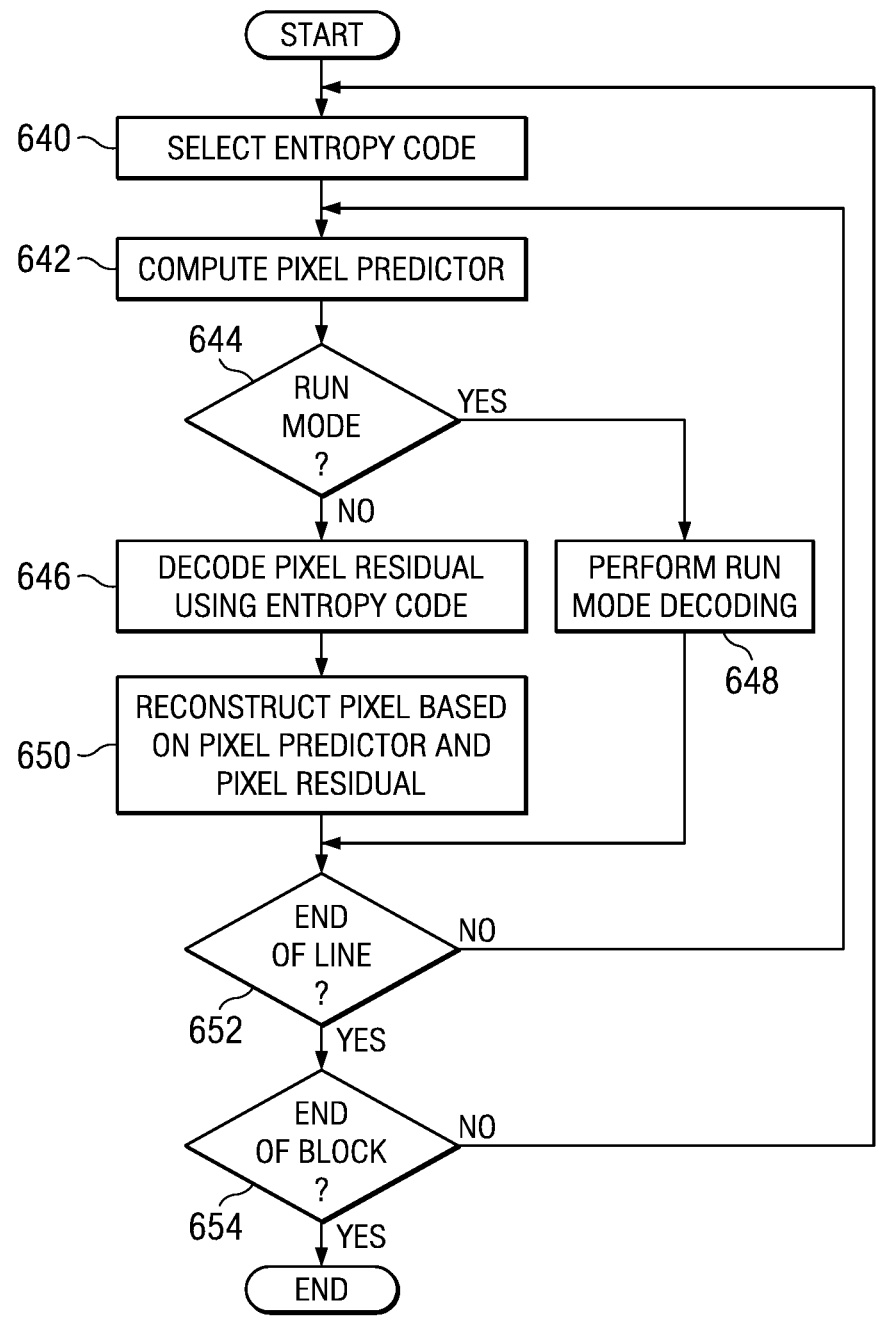
FIGS. 6D and 6E show a flow diagram of a method for digital image data decompression in accordance with one or more embodiments of the invention.
Figure 6E:
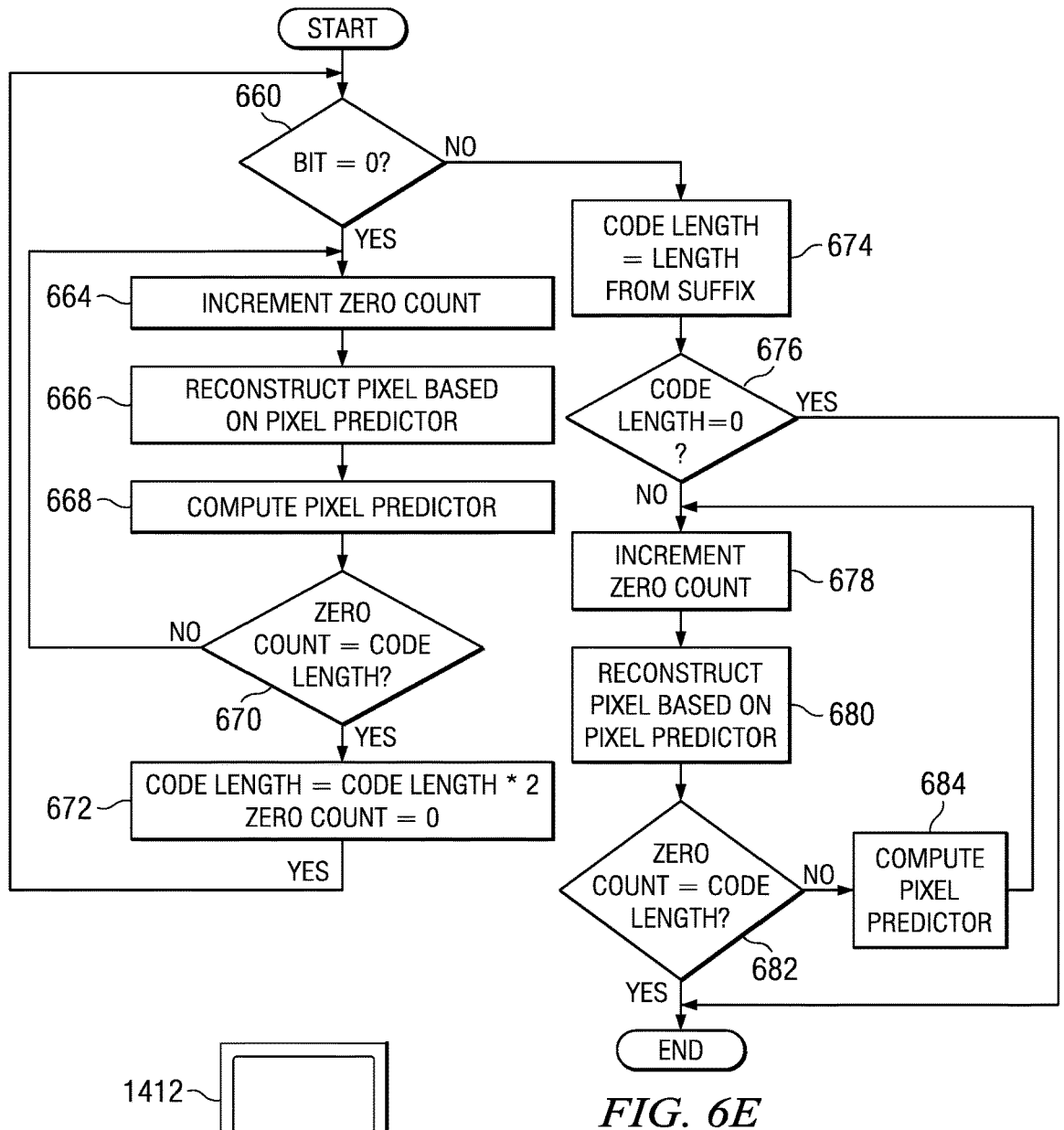

FIGS. 6D and 6E show flow diagrams of a method for decompression of digital image data compressed using the method for lossless compression of FIGS. 6A-6C in accordance with one or more embodiments of the invention. At the beginning of each line in the digital image data, an entropy code is selected for use during regular mode decoding (640). That is, an indicator of which entropy code to use is read from the bit stream of compressed digital video data. Once the entropy code is selected (640), each of the pixels in the line is decoded. First, a pixel predictor is computed for the current pixel to be decoded (642) using spatial prediction. The computation of the pixel predictor is similar to that described above in relation to FIG. 6B. First, the minimum absolute sample difference (MASD) for the pixel is computed based on neighboring decoded pixels. The neighboring pixels used for computing the MASD are the same as those used for computing the MASD during encoding and the MASD is computed as previously described in relation to FIG. 6B.

The pixel predictor is then computed based on which ASD was selected as the MASD. If the ASD of the top left neighbor, i.e., pixel A, and the left neighbor, i.e., pixel C, is the MASD, then the pixel predictor is the top neighbor, i.e., pixel B. If the ASD of the top left neighbor, i.e., pixel A, and the top neighbor, i.e., pixel B, is the MASD, then the pixel predictor is the left neighbor, i.e., pixel C. If the ASD of the top left neighbor, i.e., pixel A, and the interpolated pixel value is the MASD, then the pixel predictor is the interpolated pixel value.

Once the pixel predictor is computed (642), a check is made to determine if run mode decoding is to be performed (644). The same criteria that was used during encoding to decide whether or not to activate run mode encoding is used to determine if run mode decoding is to be performed. In one or more embodiments of the invention, when the pixel residual of the previous pixel, i.e., the left neighbor (pixel C in FIG. 7), is 0 and selected neighboring decoded pixels have the same value, run mode decoding is performed. In some embodiments of the invention, the neighboring pixels considered are the top left neighbor, i.e., pixel A, the top neighbor, i.e., pixel B, the top right neighbor, i.e., pixel D, and the left neighbor, i.e., pixel C. In some embodiments, if the pixel residual of C is 0 and A=B=C=D, then run mode decoding is performed. Alternatively, in some embodiments, run mode decoding is performed if the pixel residual of C is 0 and A=C. Alternatively, in some embodiments, run mode decoding is performed if the pixel residual of C is 0 and A=B=D. If run mode decoding is to be performed, some initialization for run mode decoding may be performed such as setting the initial code length to two, and setting the count of the number of zero residual values decoded to 0. The code length indicates the length of a run of zero residual values, i.e., how many pixel residuals are included in a run, and the count of the number of zero residual values indicates how many pixels in the run have been decoded.

If run mode decoding is to be performed (644), then some number of consecutive pixels that were encoded using run mode encoding are decoded using run mode decoding. As was previously explained, a consecutive sequence of pixels having zero residual values may be encoded in run mode as a codeword having a prefix, a separator, and a suffix. The prefix of the code word is a sequence of binary zeros in which each binary 0 represents a run of consecutive zero residual values, the separator is a binary 1, and the suffix is a binary number indicating the remaining number of zero residual values encoded by the code word. In general, run mode decoding reverses the run mode encoding.

FIG. 6E shows a flow diagram of a method for run mode decoding in accordance with one or more embodiments of the invention. If the next bit is a 0 bit (660), then a run of pixels of length code length is to be decoded. The count of the number of zero residual values is incremented (664) and the current pixel is reconstructed based on the current pixel predictor (666). More specifically, the decoded value output for the current pixel is that of the predictor computed for the pixel. After the current pixel is reconstructed, a pixel predictor is computed for the next pixel (668). Then, a check is made to determine if all pixels in the run have been decoded, i.e., if the count of the number of zero residual values is equal to the code length (670). If all of the pixels in the run have not been decoded, decoding of the run continues (664). If all of the pixels in the run have been decoded, then the code length is doubled, the count of the number of pixel residuals is reset to zero (672), and the next bit is read (660).

If the next bit is a 1 bit (i.e., the separator) (660), then run mode decoding is to be terminated. The suffix of the code word is read to determine the count of the remaining number of pixels to be decoded and this count is assigned as the code length (674). As was previously explained, the suffix is a binary number of length $\log_2$(code length). If this count is 0 (676), the run mode decoding is ended. Otherwise, a number of pixels equal to the count are decoded. A process of incrementing the count of zero value residuals decoded (678), reconstructing the pixel (680), and computing the pixel predictor for the next pixel (684) is repeated until the remainder of the pixels encoded by the code word are decoded (682).

Referring again to FIG. 6D, after run mode decoding is performed (648), the decoding continues with the next pixel in the line (652) or the first pixel in the next line (654) unless the end of the block has been reached.

If run mode decoding is not to be performed (644), the pixel residual for the current pixel is decoded using the selected entropy code (646). The current pixel is then reconstructed based on the pixel predictor and the pixel residual (650), i.e., the decoded value of the current pixel is the sum of the predictor and the residual. Decoding then continues with the next pixel in the line (652) or the first pixel in the next line (654) unless the end of the block has been reached.

The performance of embodiments of the above-described compression method were tested in laboratory simulations using various combinations of Golomb and exp-Golomb codes and the one-pass and two-pass approaches for selecting the entropy code for a line. FIGS. 8-11 show graphs of the test results. For each of the tests, eighteen representative HD 1080p 4:2:0 video sequences were compressed. Further, for these tests, reconstructed reference data generated by H.264 encoding of the eighteen HD sequences with four different quantization parameters (QP), 22, 27, 32, and 37 was also used. In each of the graphs, the data labeled "orig" represents results from applying the compression on original video sequences.

Figure 8:
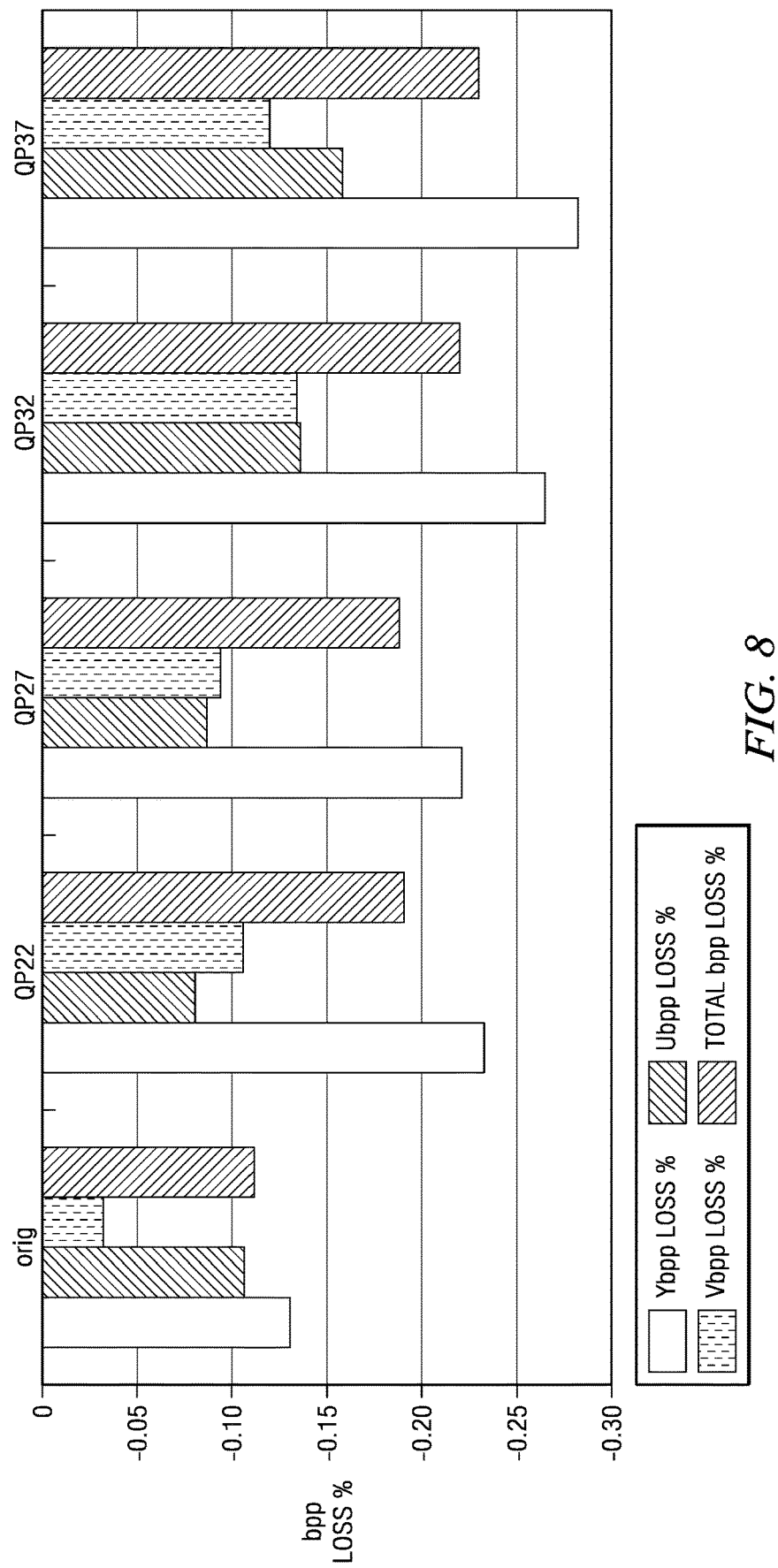
FIGS. 8-11 show graphs of test results in accordance with one or more embodiments of the invention.

FIG. 8 is a graph of test results in which the bits per pixel (bop) loss incurred using the one-pass approach for selecting the entropy code is compared to using the two-pass approach. For this graph, the bop loss percentage is the percentage decrease in the number of bits used for encoding when the two-pass approach is used as compared to using the one-pass approach. For these tests, six entropy codes were available for selection for both the one pass approach and the two-pass approach, three Golomb codes of order m=0, 1, and 2 and three exp-Golomb codes of order k=0, 1, and 2. As can be seen from this graph, the two-pass approach required fewer bits than the one-pass approach, but the difference is not significant.

Figure 9:
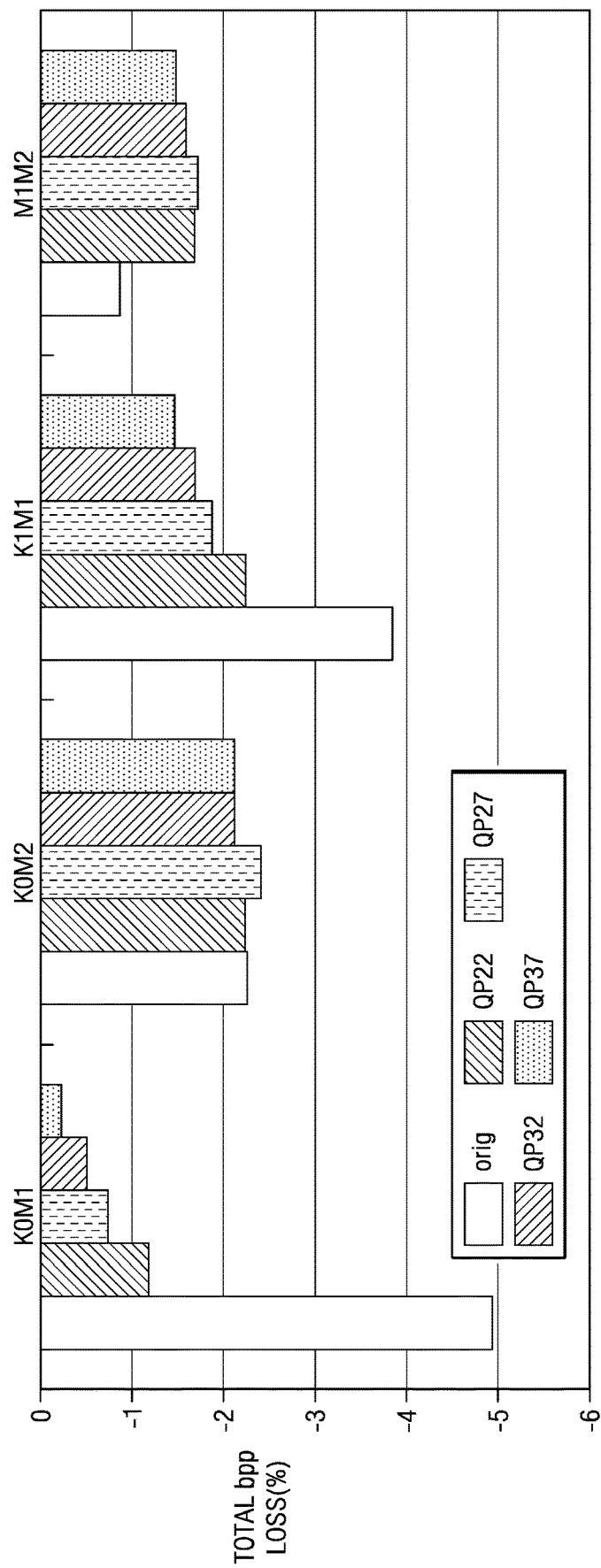

FIG. 9 is a graph of test results in which the bits per pixel (bop) loss incurred using the one-pass approach for selecting the entropy code with four different combinations of two entropy codes available for selection is compared to using the two-pass approach with six entropy codes available for selection. For this graph, the bop loss percentage is the percentage decrease in the number of bits used for encoding when the two-pass approach is used as compared to using the one-pass approach with each of the four combinations of two entropy codes. For all of the tests, the six entropy codes available for selection for the two-pass approach were three Golomb codes of order m=0, 1, and 2 and three exp-Golomb codes of order k=0, 1, and 2. The four combinations of entropy codes available for selection for the one-pass approach were: 1) the exp-Golomb code of order k=0 and the Golomb code of order m=1; 2) the exp-Golomb code of order k=0 and the Golomb code of order m=2; 3) the exp-Golomb code of order k=1 and the Golomb code of order m=1; and 4) the Golomb codes of order m=1 and 2.

Figure 10:
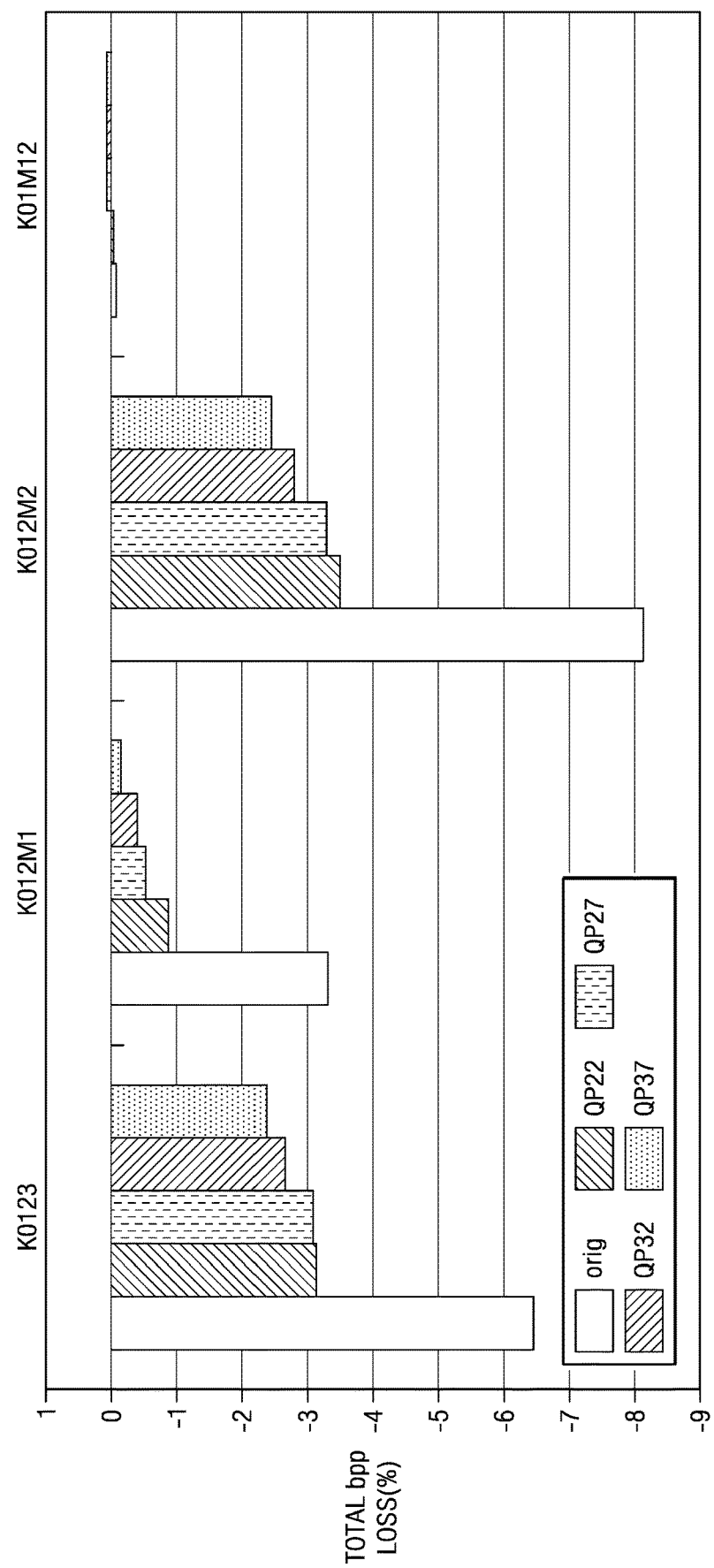

FIG. 10 is a graph of test results in which the bits per pixel (bpp) loss incurred using the one-pass approach for selecting the entropy code with four different combinations of four entropy codes available for selection is compared to using the two-pass approach with six entropy codes available for selection. For this graph, the bpp loss percentage is the percentage decrease in the number of bits used for encoding when the two-pass approach is used as compared to using the one-pass approach with each of the four combinations of four entropy codes. For all of the tests, the six entropy codes available for selection for the two-pass approach were three Golomb codes of order m=0, 1, and 2 and three exp-Golomb codes of order k=0, 1, and 2. The four combinations of entropy codes available for selection for the one-pass approach were: 1) the exp-Golomb codes of order k=0, 1, 2, and 3; 2) the exp-Golomb codes of order k=0, 1, and 2 and the Golomb code of order m=1; 3) the exp-Golomb codes of order k=0, 1, and 2 and the Golomb code of order m=2; and 4) the exp-Golomb codes of order k=0 and 1 and the Golomb codes of order m=1 and 2. As can be seen from this graph, the percentage difference in bit count between the two pass approach using six entropy codes and the one pass approach using the exp-Golomb codes of order k=0 and 1 and the Golomb codes of order m=1 and 2 was very insignificant.

Figure 11:
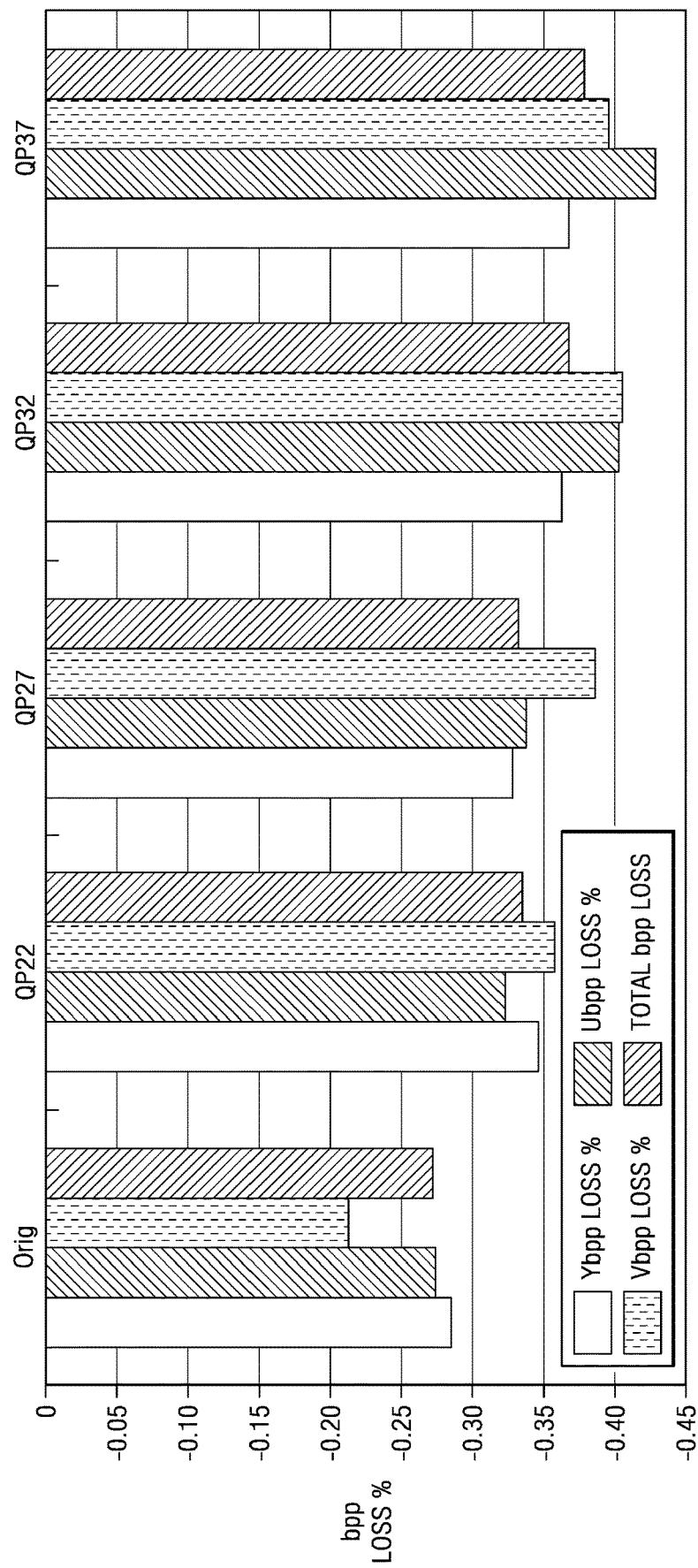

FIG. 11 is a graph of the detailed test results in which the bits per pixel (bpp) loss incurred using the one-pass approach for selecting the entropy code with the Golomb codes of order k=0 and 1 and the exp-Golomb codes of order m=1 and 2 available for selection is compared to using the two-pass approach with six entropy codes as previously described available for selection. For this graph, the bpp loss percentage is the percentage decrease in the number of bits used for encoding when the two-pass approach with six entropy codes is used as compared to using the one-pass approach with the four specific entropy codes.

Based on these test results, embodiments of the invention using the one-pass approach for entropy code selection in conjunction with two exp-Golomb codes of order k=0 and 1 and two Golomb codes of order m=1 and 2 provide results that are comparable to using a more complex approach of using the two-pass approach for entropy code selection in conjunction with six entropy codes. Further, if less complexity is desired, embodiments of the invention using the one-pass approach for entropy selection with two codes, a Golomb code of order m=1 and an exp-Golomb code of order k=0 provide acceptable results.

Embodiments of the encoders and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 14:
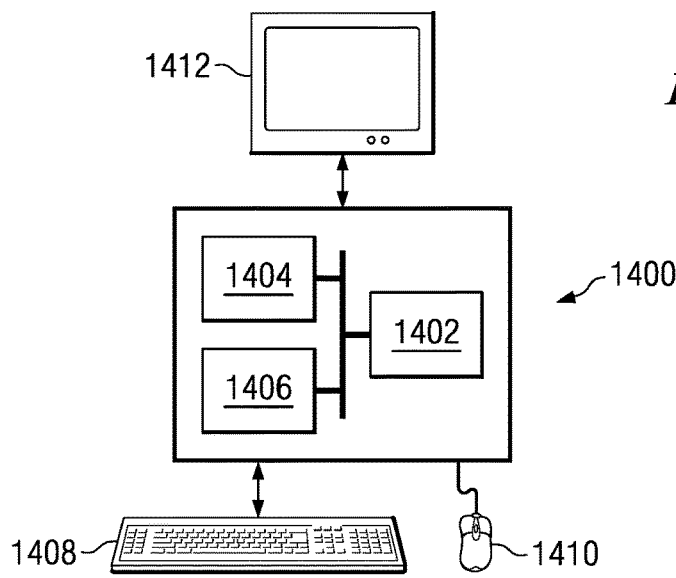
FIGS. 12-14 show illustrative digital systems in accordance with one or more embodiments of the invention.
Figure 12:
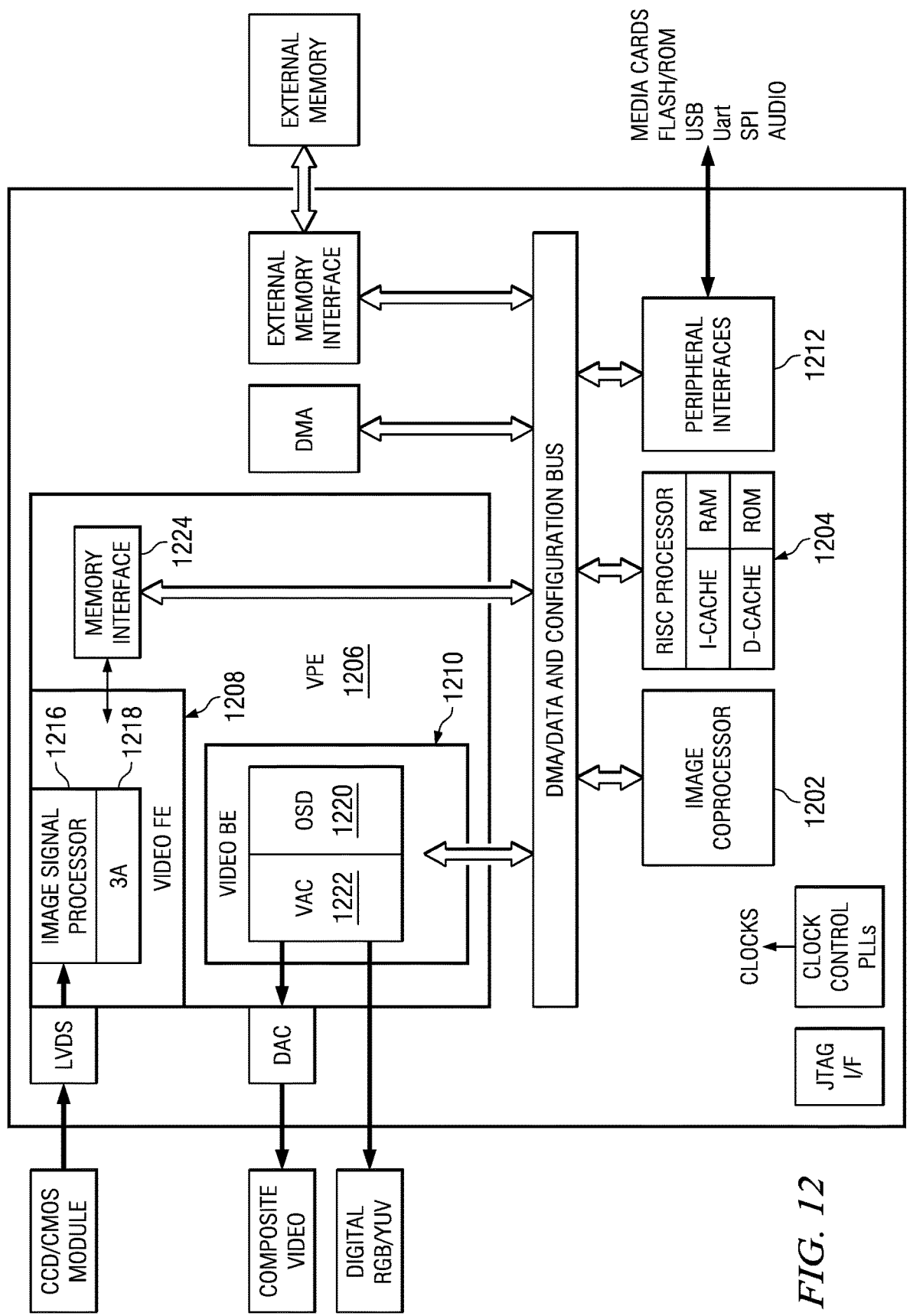
Figure 13:
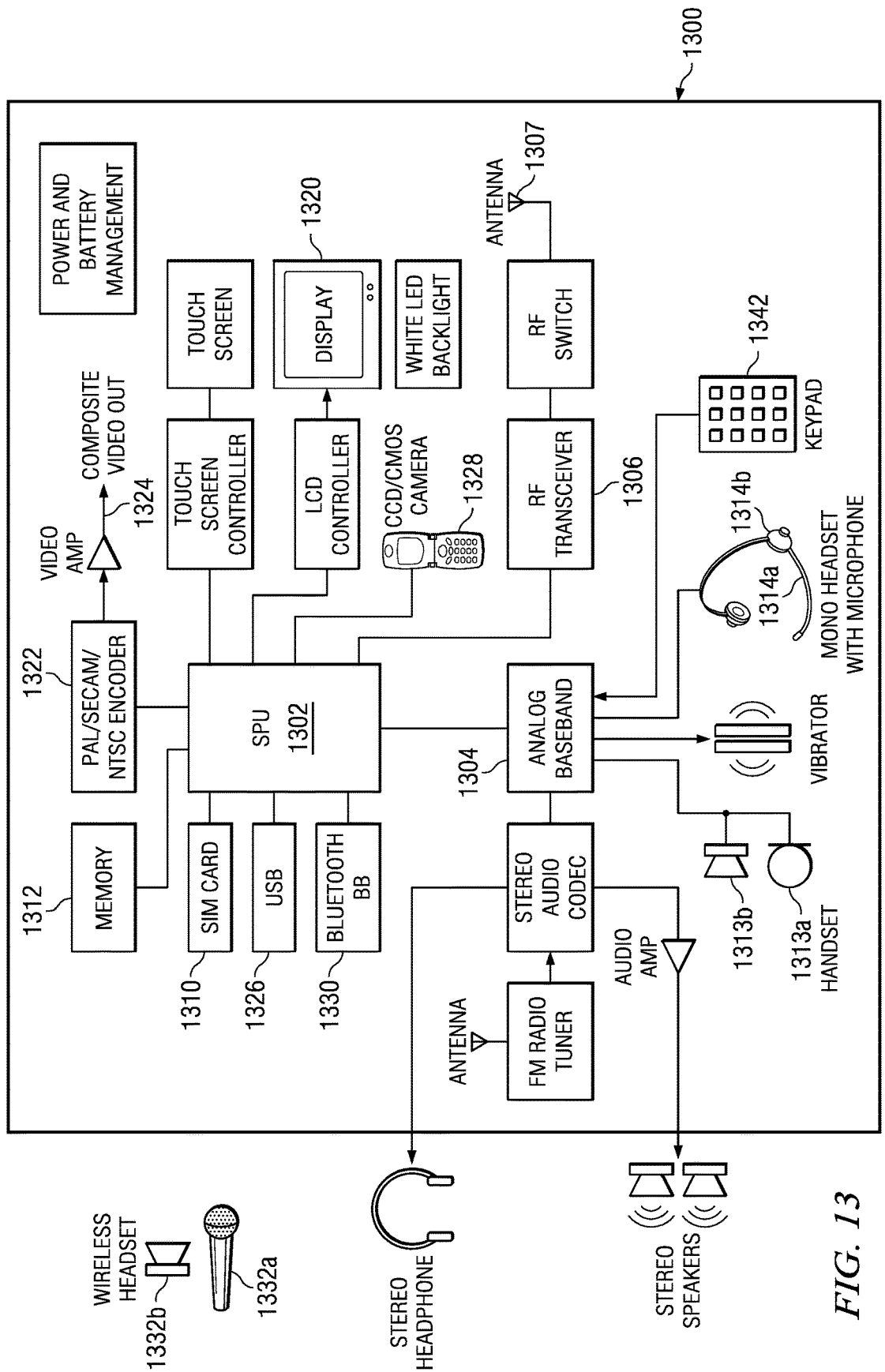

Embodiments of the methods for digital image compression and decompression as described herein may be implemented for virtually any type of digital system (e.g., a desk top computer, a laptop computer, a handheld device such as a mobile (i.e., cellular) phone, a personal digital assistant, a digital camera, etc.) with functionality to capture or otherwise generate digital image data. FIGS. 12-14 show block diagrams of illustrative digital systems.

FIG. 12 shows a digital system suitable for an embedded system (e.g., a digital camera) in accordance with one or more embodiments of the invention that includes, among other components, a DSP-based image coprocessor (ICP) (1202), a RISC processor (1204), and a video processing engine (VPE) (1206) that may be configured to perform methods for digital image data compression and decompression described herein. The RISC processor (1204) may be any suitably configured RISC processor. The VPE (1206) includes a configurable video processing front-end (Video FE) (1208) input interface used for video capture from imaging peripherals such as image sensors, video decoders, etc., a configurable video processing back-end (Video BE) (1210) output interface used for display devices such as SDTV displays, digital LCD panels, HDTV video encoders, etc, and memory interface (1224) shared by the Video FE (1208) and the Video BE (1210). The digital system also includes peripheral interfaces (1212) for various peripherals that may include a multi-media card, an audio serial port, a Universal Serial Bus (USB) controller, a serial port interface, etc.

The Video FE (1208) includes an image signal processor (ISP) (1216), and a 3 A statistic generator (3 A) (1218). The ISP (1216) provides an interface to image sensors and digital video sources. More specifically, the ISP (1216) may accept raw image/video data from a sensor (CMOS or CCD) and can accept YUV video data in numerous formats. The ISP (1216) also includes a parameterized image processing module with functionality to generate image data in a color format (e.g., RGB) from raw CCD/CMOS data. The ISP (1216) is customizable for each sensor type and supports video frame rates for preview displays of captured digital images and for video recording modes. The ISP (1216) also includes, among other functionality, an image resizer, statistics collection functionality, and a boundary signal calculator. The 3 A module (1218) includes functionality to support control loops for auto focus, auto white balance, and auto exposure by collecting metrics on the raw image data from the ISP (1216) or external memory.

The Video BE (1210) includes an on-screen display engine (OSD) (1220) and a video analog encoder (VAC) (1222). The OSD engine (1220) includes functionality to manage display data in various formats for several different types of hardware display windows and it also handles gathering and blending of video data and display/bitmap data into a single display window before providing the data to the VAC (1222) in YCbCr format. The VAC (1222) includes functionality to take the display frame from the OSD engine (1220) and format it into the desired output format and output signals required to interface to display devices. The VAC (1222) may interface to composite NTSC/PAL video devices, S-Video devices, digital LCD devices, high-definition video encoders, DVI/HDMI devices, etc.

The memory interface (1224) functions as the primary source and sink to modules in the Video FE (1208) and the Video BE (1210) that are requesting and/or transferring data to/from external memory. The memory interface (1224) includes read and write buffers and arbitration logic. In one or more embodiments of the invention, the Video FE (1208) and the Video BE (1210) are configured to perform compression of digital image data prior to transferring the data to external memory in accordance with a compression method described herein and to perform decompression of digital image data when transferring the data from external memory.

The ICP (1202) includes functionality to perform the computational operations required for video encoding other processing of captured images. The video encoding standards supported may include one or more of the JPEG standards, the MPEG standards, and the H.26x standards. In one or more embodiments of the invention, the ICP (1202) is configured to perform the computational operations of an embodiment of the compression and decompression methods described herein.

In operation, to capture an image or video sequence, video signals are received by the video FE (1208) and converted to the input format needed to perform video encoding. The video data generated by the video FE (1208) is stored in then stored in external memory. Prior to storing the video data in external memory, the video data is compressed using a method for compression described herein. The video data is then encoded by a video encoder. During the encoding process, the video encoder reads the compressed input video data from the external memory and the computations for encoding this video data are performed by the ICP (1202). The reference pictures generated during video encoding are compressed using a method for compression described herein. As the compressed reference picture video data is read from the external memory, the reference picture video data is decompressed using a method for decompression described herein. The encoded video data may then be read from the external memory, decoded, and post-processed by the video BE (1210) to display the image/video sequence.

FIG. 13 is a block diagram of a digital system (e.g., a mobile cellular telephone) (1300) that may be configured to perform the methods described herein. The signal processing unit (SPU) (1302) includes a digital processing processor system (DSP) that includes embedded memory and security features. The analog baseband unit (1304) receives a voice data stream from handset microphone (1313a) and sends a voice data stream to the handset mono speaker (1313b). The analog baseband unit (1304) also receives a voice data stream from the microphone (1314a) and sends a voice data stream to the mono headset (1314b). The analog baseband unit (1304) and the SPU (1302) may be separate ICs. In many embodiments, the analog baseband unit (1304) does not embed a programmable processor core, but performs processing based on configuration of audio paths, filters, gains, etc being setup by software running on the SPU (1302). In some embodiments, the analog baseband processing is performed on the same processor and can send information to it for interaction with a user of the digital system (1300) during a call processing or other processing.

The display (1320) may also display pictures and video streams received from the network, from a local camera (1328), or from other sources such as the USB (1326) or the memory (1312). The SPU (1302) may also send a video stream to the display (1320) that is received from various sources such as the cellular network via the RF transceiver (1306) or the camera (1326). The SPU (1302) may also send a video stream to an external video display unit via the encoder (1322) over a composite output terminal (1324). The encoder unit (1322) may provide encoding according to PAL/SECAM/NTSC video standards.

The SPU (1302) includes functionality to perform the computational operations required for video encoding and decoding. The video encoding standards supported may include, for example, one or more of the JPEG standards, the MPEG standards, and the H.26x standards. In one or more embodiments of the invention, the SPU (1302) is configured to perform the computational operations of one or more of the methods for compression and decompression of digital image data described herein. Software instructions implementing the one or more methods may be stored in the memory (1312) and executed by the SPU (1302) as part of capturing and/or encoding of digital image data, e.g., pictures and video streams.

FIG. 14 shows a digital system (1400) (e.g., a personal computer) that includes a processor (1402), associated memory (1404), a storage device (1406), and numerous other elements and functionalities typical of digital systems (not shown). In one or more embodiments of the invention, a digital system may include multiple processors and/or one or more of the processors may be digital signal processors. The digital system (1400) may also include input means, such as a keyboard (1408) and a mouse (1410) (or other cursor control device), and output means, such as a monitor (1412) (or other display device). The digital system (1400) may also include an image capture device (not shown) that includes circuitry (e.g., optics, a sensor, readout electronics) for capturing video sequences. The digital system (1400) may include a video encoder with functionality to perform embodiments of the methods as described herein. The digital system (1400) may be connected to a network (1414) (e.g., a local area network (LAN), a wide area network (WAN) such as the Internet, a cellular network, any other similar type of network and/or any combination thereof) via a network interface connection (not shown). Those skilled in the art will appreciate that the input and output means may take other forms.

Further, those skilled in the art will appreciate that one or more elements of the aforementioned digital system (1400) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, memory, or any other computer readable storage device. The software instructions may be distributed to the digital system (1400) via removable computer readable media (e.g., floppy disk, optical disk, flash memory, USB key), via a transmission path from computer readable media on another digital system, etc.

While the invention has been described with respect to a limited number of embodiments, those skilled in the art, having benefit of this disclosure, will appreciate that other embodiments can be devised which do not depart from the scope of the invention as disclosed herein. For example, the compression and decompression may be applied to a segment of consecutive pixels that is shorter than a line. In another example, a special encoding mode may be added to further improve the compression performance by preventing expansion. Expansion occurs when the number of bits used to encode a line of pixels is larger than the number of bits in the unencoded line. In this special mode, the number of bits needed to encode a line of pixels is counted prior to actually encoding the pixels. If the number of bits exceeds the number of bits in the original line of pixels, then the original pixel values in the line are output instead of encoding them. In another example, rather than using the above cited neighbors for a pixel for spatial prediction and determining use of run mode encoding/decoding, only the left neighbor may be used. In another example, in the two-pass approach for selecting an entropy code, rather than counting bits for every pixel, the bits may be counted every N pixels. Accordingly, the scope of the invention should be limited only by the attached claims.

It is therefore contemplated that the appended claims will cover any such modifications of the embodiments as fall within the true scope and spirit of the invention.

The invention claimed is:

1. A method comprising:
   computing a minimum absolute sample difference (MASD) for a pixel in a line of pixels based on differences between different combinations of neighboring pixels of the pixel, wherein the neighboring pixels comprise a left neighboring pixel in the line of pixels, a top left neighboring pixel in a previous line of pixels, and a top neighboring pixel in the previous line of pixels, and wherein the smallest of the differences between the different combinations of the neighboring pixels of the pixel is selected as the MASD for the pixel; and
   in response to the MASD for the pixel being below a threshold, encoding the pixel using variable length coding.

2. The method of claim 1, further comprising in response to the MASD for the pixel being above a threshold, encoding the pixel using fixed length coding.

3. The method of claim 1, comprising:
   determining the threshold using a quantization parameter; and
   computing a prediction error based on the MASD;
   quantizing the prediction error based on the quantization parameter.

4. The method of claim 1, further comprising:
   counting a number of bits required for encoding a previous line of pixels using each of a plurality of variable length entropy codes as the previous line is encoded; and
   selecting a variable length entropy code for the variable length coding that requires a least number of bits.

5. The method of claim 3, wherein quantizing the prediction error based on the quantization parameter comprises quantizing the prediction error using a linear quantization based on the quantization parameter.

6. The method of claim 1, wherein a variable length code used for the variable length coding is a signed exponential-Golomb code.

7. The method of claim 1, wherein the computing step and the encoding step are performed independently for each color component of the pixel.

8. One or more computer-readable non-transitory storage media embodying software that is operable when executed to:
   compute a minimum absolute sample difference (MASD) for a pixel in a line of pixels based on differences between different combinations of neighboring pixels of the pixel, wherein the neighboring pixels comprise a left neighboring pixel in the line of pixels, a top left neighboring pixel in a previous line of pixels, and a top neighboring pixel in the previous line of pixels, and wherein the smallest of the differences between the different combinations of the neighboring pixels of the pixel is selected as the MASD for the pixel; and
   in response to the MASD for the pixel being below a threshold, encode the pixel using variable length coding.

9. The media of claim 8, wherein the software is further operable when executed to:
   in response to the MASD being above a threshold, encoding the pixel using fixed length coding.

10. The media of claim 8, wherein the software is further operable when executed to:
    count a number of bits required for encoding the line of pixels using each of a plurality of variable length entropy codes; and select a variable length entropy code for the variable length coding that requires a least number of bits.

11. The media of claim 8, wherein the software is further operable when executed to:
   count a number of bits required for encoding a previous line of pixels using each of a plurality of variable length entropy codes as the previous line is encoded; and
   select a variable length entropy code for the variable length coding that requires a least number of bits.

12. The media of claim 8, wherein the software is further operable when executed to:
   determine the threshold using a quantization parameter;
   compute a prediction error based on the MASD; and
   quantize the prediction error based on the quantization parameter.

13. The media of claim 12, wherein quantizing the prediction error based on the quantization parameter comprises quantizing the prediction error using a linear quantization based on the quantization parameter.

14. A system comprising: one or more processors; and a memory coupled to the processors comprising instructions executable by the processors, the processors being operable when executing the instructions to:
   compute a minimum absolute sample difference (MASD) for a pixel in a line of pixels based on differences between different combinations of neighboring pixels of the pixel, wherein the neighboring pixels comprise a left neighboring pixel in the line of pixels, a top left neighboring pixel in a previous line of pixels, and a top neighboring pixel in the previous line of pixels, and wherein the smallest of the differences between the different combinations of the neighboring pixels of the pixel is selected as the MASD for the pixel; and
   in response to the MASD for the pixel being below a threshold, encode the pixel using variable length coding.

15. The system of claim 14, wherein the processors are further operable when executing the instructions to:
   in response to the MASD for the pixel being above a threshold, encode the pixel using fixed length coding.

16. The system of claim 14, wherein the processors are further operable when executing the instructions to:
   count a number of bits required for encoding the line of pixels using each of a plurality of variable length entropy codes; and
   select a variable length entropy code for the variable length coding that requires a least number of bits.

17. The system of claim 14, wherein the processors are further operable when executing the instructions to:
   count a number of bits required for encoding a previous line of pixels using each of a plurality of variable length entropy codes as the previous line is encoded; and
   select a variable length entropy code for the variable length coding that requires a least number of bits.

18. The system of claim 14, wherein the processors are further operable when executing the instructions to:
   determining the threshold using a quantization parameter; and
   computing a prediction error based on the MASD;
   quantizing the prediction error based on the quantization parameter.

19. The system of claim 18, wherein quantizing the prediction error based on the quantization parameter comprises quantizing the prediction error using a linear quantization based on the quantization parameter.

* * * * *